US008105558B2

(12) United States Patent
Comrie

(10) Patent No.: US 8,105,558 B2
(45) Date of Patent: *Jan. 31, 2012

(54) CARBON DIOXIDE SEQUESTRATION MATERIALS AND PROCESSES

(75) Inventor: Douglas C. Comrie, Port Clinton, OH (US)

(73) Assignee: C-Quest Technologies, LLC, Cape Coral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/025,905

(22) Filed: Feb. 11, 2011

(65) Prior Publication Data

US 2011/0135548 A1 Jun. 9, 2011

Related U.S. Application Data

(63) Continuation of application No. 12/224,863, filed as application No. PCT/US2007/005976 on Mar. 8, 2007, now Pat. No. 7,906,086.

(60) Provisional application No. 60/782,325, filed on Mar. 10, 2006.

(51) Int. Cl.
B01D 53/34 (2006.01)
B01D 53/62 (2006.01)
B01D 53/68 (2006.01)
B01D 53/56 (2006.01)
B01D 53/50 (2006.01)
B01D 53/72 (2006.01)
B01D 53/64 (2006.01)
B01D 53/66 (2006.01)
B01D 53/58 (2006.01)

(52) U.S. Cl. ........... 423/210; 423/215.5; 423/219; 423/220; 423/225; 423/238; 423/240 R; 423/243.01; 423/245.1; 423/430; 423/635; 106/713

(58) Field of Classification Search .............. 423/210, 423/215.5, 219, 220, 225, 235, 238, 240 R, 423/243.01, 245.1, 430, 635; 106/713
See application file for complete search history.

(56) References Cited

U.S. PATENT DOCUMENTS 4,058,587 A 11/1977 Nelson
(Continued)

FOREIGN PATENT DOCUMENTS

AR 068502 11/2009
(Continued)

OTHER PUBLICATIONS

D. C. Johnson et al. "Solidification of Stainless Steel Slag by Accelerated Carbonation" Environmental Technology, vol. 24, pp. 671-678, (2003).*

(Continued)

Primary Examiner — Timothy Vanoy
(74) Attorney, Agent, or Firm — Harness, Dickey & Pierce, PLC

(57) ABSTRACT

The disclosure provides methods and systems for sequestering and/or reducing carbon dioxide present in an industrial effluent fluid stream containing carbon dioxide. A scrubbing material comprising a first component, a second component (distinct from the first component), and preferably water, is contacted with the effluent fluid stream. The first component comprises a source of calcium oxide and a source of alkali metal ions. The second component comprises a slag having one or more reactive silicate compounds. Methods of reducing carbon dioxide from exhaust generated by combustion sources, lime and/or cement kilns, iron and/or steel furnaces, and the like are provided. Carbon dioxide emission abatement systems are also disclosed. Methods of recycling industrial byproducts are further provided.

26 Claims, 4 Drawing Sheets

U.S. PATENT DOCUMENTS

| | | | |
|---|---|---|---|
| 4,091,076 | A | 5/1978 | Vogel et al. |
| 4,124,404 | A | 11/1978 | Suzuki et al. |
| 4,179,490 | A | 12/1979 | Judd |
| 4,208,384 | A | 6/1980 | Mitchell |
| 4,452,766 | A | 6/1984 | Pike |
| 4,718,361 | A | 1/1988 | Berry |
| 4,888,160 | A | 12/1989 | Kosin et al. |
| 4,917,732 | A | 4/1990 | Baker |
| 5,455,013 | A | 10/1995 | Shibata et al. |
| 5,520,894 | A | 5/1996 | Heesink et al. |
| 5,665,319 | A | 9/1997 | Hirama et al. |
| 5,670,122 | A | 9/1997 | Zamansky et al. |
| 5,690,729 | A | 11/1997 | Jones, Jr. |
| 5,695,733 | A | 12/1997 | Kroc et al. |
| 5,895,634 | A | 4/1999 | Mitsuoka et al. |
| 5,925,326 | A | 7/1999 | Kapoor et al. |
| 5,939,036 | A | 8/1999 | Porter et al. |
| 5,997,629 | A | 12/1999 | Hills |
| 6,132,696 | A | 10/2000 | Porter et al. |
| 6,174,506 | B1 | 1/2001 | Chakravarti et al. |
| 6,187,277 | B1 | 2/2001 | Kirschner |
| 6,306,357 | B1 | 10/2001 | Simonson et al. |
| 6,387,337 | B1 | 5/2002 | Pennline et al. |
| 6,485,697 | B1 | 11/2002 | Chao |
| 6,506,349 | B1 | 1/2003 | Khanmamedov |
| 6,596,248 | B2 | 7/2003 | Schimkat et al. |
| 6,645,446 | B1 | 11/2003 | Won et al. |
| 6,890,497 | B2 | 5/2005 | Rau et al. |
| 6,946,014 | B2 | 9/2005 | Poupardin et al. |
| 7,036,304 | B2 | 5/2006 | Sakai |
| 7,906,086 | B2 | 3/2011 | Comrie |
| 7,993,616 | B2 | 8/2011 | Comrie |
| 2001/0054253 | A1 | 12/2001 | Takahashi et al. |
| 2003/0157008 | A1 | 8/2003 | Pahlman et al. |
| 2004/0109801 | A1 | 6/2004 | Otsuka et al. |
| 2004/0129181 | A1 | 7/2004 | Lalande et al. |
| 2004/0200393 | A1 | 10/2004 | Zauderer |
| 2004/0265199 | A1 | 12/2004 | MacKnight |
| 2005/0132883 | A1 | 6/2005 | Su et al. |
| 2006/0185560 | A1 | 8/2006 | Ramme et al. |
| 2007/0006778 | A1 | 1/2007 | Kehrmann |
| 2007/0154380 | A1 | 7/2007 | Takahashi et al. |
| 2007/0184394 | A1 | 8/2007 | Comrie |
| 2009/0001020 | A1 | 1/2009 | Constantz et al. |
| 2009/0020044 | A1 | 1/2009 | Constantz et al. |
| 2009/0169452 | A1 | 7/2009 | Constantz et al. |
| 2009/0301352 | A1 | 12/2009 | Constantz et al. |
| 2010/0000444 | A1 | 1/2010 | Constantz et al. |
| 2010/0006450 | A1 | 1/2010 | Whitehead et al. |
| 2010/0024686 | A1 | 2/2010 | Constantz et al. |
| 2010/0063902 | A1 | 3/2010 | Constantz et al. |
| 2010/0077922 | A1 | 4/2010 | Constantz et al. |
| 2010/0084280 | A1 | 4/2010 | Gilliam et al. |
| 2010/0132556 | A1 | 6/2010 | Constantz et al. |
| 2010/0135865 | A1 | 6/2010 | Constantz et al. |
| 2010/0135882 | A1 | 6/2010 | Constantz et al. |
| 2010/0140103 | A1 | 6/2010 | Gilliam et al. |
| 2010/0144521 | A1 | 6/2010 | Constantz et al. |
| 2010/0154679 | A1 | 6/2010 | Constantz et al. |
| 2010/0158786 | A1 | 6/2010 | Constantz et al. |

FOREIGN PATENT DOCUMENTS

| | | |
|---|---|---|
| AU | 2007225296 | 9/2007 |
| AU | 2008302185 | 3/2009 |
| BR | PI0708702 | 6/2011 |
| CA | 2646462 | 9/2007 |
| CA | 2700189 A1 | 3/2009 |
| CN | 101400430 | 4/2009 |
| CN | 101828074 | 9/2010 |
| EP | 1741682 | 1/2007 |
| EP | 2001577 | 12/2008 |
| EP | 2203681 | 7/2010 |
| JP | 52050985 | 4/1977 |
| JP | 05-154349 | 6/1993 |
| JP | 10-009510 | 1/1998 |
| JP | 10-249153 | 9/1998 |
| JP | 11-216332 | 8/1999 |
| JP | 2006-305566 | 11/2006 |
| JP | 2009529408 | 8/2009 |
| RU | 2095436 | 11/1997 |
| RU | 2250129 | 4/2005 |
| RU | 2261846 | 10/2005 |
| RU | 2008140176 | 4/2010 |
| SU | 1301801 | 4/1987 |
| WO | WO 93/20013 | 10/1993 |
| WO | WO 01/34294 | 5/2001 |
| WO | WO 2005/108297 | 11/2005 |
| WO | WO 2007/108719 | 2/2007 |
| WO | WO 2007/106372 | 3/2007 |
| WO | WO 2008/148055 | 12/2008 |
| WO | WO 2009/006295 | 1/2009 |
| WO | WO 2009/039393 | 3/2009 |
| WO | WO 2009/086460 | 7/2009 |
| WO | WO 2009/146436 | 12/2009 |
| WO | WO 2009/155378 | 12/2009 |
| WO | WO 2010/006242 | 1/2010 |
| WO | WO 2010/008896 | 1/2010 |
| WO | WO 2010/009273 | 1/2010 |
| WO | WO 2010/030826 | 3/2010 |
| WO | WO 2010/039909 | 4/2010 |
| WO | WO 2010/074686 | 7/2010 |
| WO | WO 2010/087823 | 8/2010 |

OTHER PUBLICATIONS

Applicant's Response to the Examination Report as filed with the European Patent Office on Apr. 30, 2010 in related matter European Pat. App. No. 07752660.6 (Pub. No. EP 2001577).

Applicant's Response to Communication under Article 94(3) EPC, filed with the European Patent Office on Jul. 6, 2010 in related matter European Pat. App. No. 07752660.6 (Pub. No. EP 2001577).

Applicant's Response to Final Rejection of Dec. 9, 2010 as filed on Mar. 9, 2011, in cross-referenced matter U.S. Appl. No. 12/233,144.

Applicant's Response to Non-Final Rejection of Apr. 26, 2010 as filed on Sep. 27, 2010, in cross-referenced matter U.S. Appl. No. 12/233,144.

Bertos et al., "A review of accelerated carbonation technology in the treatment of cement-based materials and sequestration of CO2," Journal of Hazardous Materials, B112, pp. 193-205 (2004).

Chizmeshya et al., HCAPLUS Chem. Abstract for "CO2 Mineral Carbonation Processes in Olivine Feedstock: Insights from the Atomic Scale Simulation," from Proceedings of the International Technical Conference on Coal Utilization and Fuel Systems (2004), 29th, vol. 1 pp. 59-70 (abstract only).

Communication from the European Patent Office pursuant to Article 94(3) EPC, issued on May 10, 2010 in related matter European Pat. App. No. 07752660.6 (Pub. No. EP 2001577).

Debbie Beach et al., "Carbon Sequestration in Waste Mineral Byproducts," Presentation from the Fourth Annual Conference on Carbon Capture & Sequestration, Alexandria Virgina (May 2-5, 2005).

Deborah N. Huntzinger, "Carbon Dioxide Sequestration in Cement Kiln Dust Through Mineral Carbonation," Doctor of Philosophy Dissertation for Geological Engineering at Michigan Technological University (2007).

Fauth et al., "Carbon Storage and Sequestration as Mineral Carbonates," Chapter 8 of Environmental Challenges and Greenhouse Gas Control for Fossil Fuel Utilization in the 21st Century, (2002), M. Mercedes Maroto-Valer et al. Eds.

Fauth et al., HCAPLUS Chem. Abstract for "Preprints of Symposia—American Chemical Society, Division of Fuel Chemistry," (2001) vol. 46, No. 1, pp. 278-279 (abstract only).

Final Rejection issued on Dec. 9, 2010, in cross-referenced matter U.S. Appl. No. 12/233,144.

International Preliminary Report on Patentability Issued on Mar. 24, 2010 for cross-referenced matter International Application No. PCT/US2008/077049 (WO 2009/039393).

Ityokumubul et al., "Reactor Design Considerations in Mineral Sequestration of Carbon Dioxide," from The Proceedings Annual International Pittsburgh Coal Conference (2001), pp. 843-852.

Johnson et al., "Solidification of Stainless Steel Slag by Accelerated Carbonation," Environmental Technology, vol. 24, pp. 671-678 (2003).

Non-Final Rejection issued on Apr. 26, 2010, in cross-referenced matter U.S. Appl. No. 12/233,144.

Written Opinion of the International Searching Authority and the International Search Report issued on Sep. 1, 2009 for cross-referenced matter International Application No. PCT/U52008/077049 (WO 2009/039393).

First Office Action from the State Intellectual Property Office of P.R. China dated Oct. 28, 2010 for related Chinese Patent Application No. 200780008692.2, translation provided by DEQI Intellectual Property Law Corporation.

Official Action from the Patent Office of the Russian Federation Application dated Mar. 21, 2011 for related Russian Patent Application No. 2008 140176, translation provided by Sojuz Patent.

Second Office Action from the State Intellectual Property Office of P.R. China dated Jun. 20, 2011 for related Chinese Patent Application No. 200780008692.2, translation provided by DEQI Intellectual Property Law Corporation.

International Preliminary Report on Patentability issued on Sep. 16, 2008 in parent application International Application No. PCT/US2007/005976 (Publication No. WO 07/106372).

Chernov et al., The Optimum Composition of Blast-Furnace Slag at the Southern Plants, Apr. 1961, Mettalurg, No. 4, pp. 6-8.

International Search Report and Written Opinion of the International Searching Authority issued on Sep. 24, 2007 in parent application International Application No. PCT/US2007/005976 (Publication No. WO 07/106372).

Communication from the European Patent Office issued on Oct. 21, 2009 in related European Pat. App. No. 07752660.6 (Pub. No. EP 2001577).

First Office Action from the State Intellectual Property Office of P.R. China dated Apr. 7, 2011 for Chinese Patent Application No. 200881121519, translation provided by Unitalen Attorneys at Law.

Applicant Initiated Interview Request Form submitted by Applicant in cross-referenced U.S. Appl. No. 12/233,144 on Aug. 25, 2010 and Proposed Claim Amendments.

Interview Summary issued on Sep. 1, 2010 in cross-referenced U.S. Appl. No. 12/233,144.

Notice of Allowance issued on Apr. 4, 2011 in cross-referenced U.S. Appl. No. 12/233,144.

Examiner's First Report dated Nov. 15, 2010 issued by IP Australia for related Australian Patent App. No. 2007225296.

* cited by examiner

CARBON DIOXIDE SEQUESTRATION MATERIALS AND PROCESSES

CROSS-REFERENCE TO RELATED APPLICATIONS

This application is a continuation of U.S. patent application Ser. No. 12/224,863 filed on Apr. 22, 2009, which issued as U.S. Pat. No. 7,906,086, and which is a 371 U.S. National Stage of International Application No. PCT/US2007/005976, filed on Mar. 8, 2007 that claims the benefit of U.S. Provisional Application No. 60/782,325, filed on Mar. 10, 2006. The entire disclosures of each of the above applications are incorporated herein by reference.

FIELD

The present disclosure relates to emissions abatement processes and in particular, to processes that sequester carbon dioxide from carbon dioxide containing fluid streams.

BACKGROUND

The statements in this section merely provide background information related to the present disclosure and may not constitute prior art.

Global climate change (i.e., global warming) is believed to be caused by anthropogenic emissions of greenhouse gases. Modeling of global warming effects predicts global increases in temperature and sea levels, shifts in weather patterns, and more extreme weather events, including flooding and droughts. Greenhouse gases include carbon dioxide, methane, nitrous oxide, water vapor, ozone, and perfluorocarbons/chlorofluorocarbons. It has been estimated that carbon dioxide accounted for about 84% of greenhouse gas emissions in the United States in 2000. The rate of emissions of carbon dioxide ($CO_2$) and other hazardous air pollutants is highly correlated to both economic and industrial growth and has increased significantly since the mid-1800s. $CO_2$ is typically generated by combustion of hydrocarbons, fossil fuels and/or by various industrial processes that generate carbon dioxide byproduct, including in cement, lime, iron, and steel manufacturing. The United States Environmental Protection Agency (EPA) and the United Nations Intergovernmental Panel on Climate Change (IPCC) classify emissions based on fuel combustion (which predominantly includes motor vehicle and power plants) and other industrial sources. 97% of anthropogenic $CO_2$ emissions in the United States are attributed to fossil-fuel combustion sources, such as power plants, incinerators, and motor vehicles. Other significant point sources of carbon-dioxide include cement, lime, and iron/steel manufacturers, all of which generate copious $CO_2$ during processing, both as a reaction byproduct and through burning of hydrocarbon fuels.

In addition to being an undesirable greenhouse gas, $CO_2$ has the potential to create operational and economic issues, as it is a diluent without any fuel value. It is an acid gas and can cause corrosion problems in the presence of water, creating carbonic acid that can be quite corrosive to some alloys.

Through international treaties, such as the Kyoto Protocol, numerous nations have committed to reducing emissions of various greenhouse gases, including $CO_2$. In the United States, there has traditionally been a great focus on developing equipment to effectively reduce emissions of regulated air pollutants, such as particulate matter, sulfur oxides, and nitrogen oxides. However, development of abatement technology for unregulated $CO_2$ emissions has lagged behind other control technology. However, as various nations implement regulations and trading programs that restrict the generation of various greenhouse gases, in particular $CO_2$, there is an emerging need for more effective and inexpensive $CO_2$ abatement technologies.

Existing methods for the removal of $CO_2$ from gas streams include chemical absorption/adsorption with particular solvent systems (amine scrubbing), membrane separation, cryogenic fractionation, and/or adsorption using molecular sieves. In disposable systems, the active material(s) will make a single pass through the reactor/scrubber and is then discarded. One-time use systems are less desirable due to the added expense and maintenance associated with the disposal of larger amounts of spent active material. Regenerative systems are designed to regenerate the active material, making it suitable for subsequent productive passes through the reactor. Molecular sieves, such as zeolites and activated carbon, are used in regenerative pressure swing adsorption (PSA) or temperature swing adsorption systems which separate gas mixtures by selective adsorption of one or more of the gases at high pressure and/or low temperature, to remove the undesirable components from a gas stream. The captured impurities are then desorbed by lowering the pressure, or increasing the temperature, of the adsorbent system (thus the system "swings" from a high to low pressure or a low to high temperature). The desorption step regenerates the adsorbent material for reuse during the subsequent adsorption step. PSA systems typically comprise several adsorption beds, through which the gas stream is passed, allowing for separation of the selected gas species. Each of the above processes has drawbacks, including high capital investment and operating costs, as well as relatively small throughput capacity and low removal efficiency in some cases. Such systems are potentially cost-prohibitive for various applications, in particular for high throughput manufacturing facilities that generate high quantities of carbon dioxide and other emissions.

Thus, there is a need for processes that reduce $CO_2$ emissions from exhaust gases of stationary sources in an efficient manner and further, are cost-effective. Additionally, $CO_2$ emission abatement equipment can preferably handle high flow rates associated with industrial applications while achieving desirable removal efficiencies. Preferably, such abatement processes are regenerative and employ recycling to embody sustainable development initiatives.

SUMMARY

In various aspects, the present disclosure provides methods for sequestering carbon dioxide as a pollutant present in an industrial effluent fluid stream containing carbon dioxide. In one aspect, a method comprises reducing an amount of carbon dioxide in the fluid stream by contacting the stream with a scrubbing material. The scrubbing material comprises a first component and a second component. In certain aspects, the reaction is conducted in the presence of water (for example, in slurry or semi-dry forms). The first component is distinct from the second component. Further, the first component comprises a source of calcium oxide and a source of alkali metal ions and the second component comprises a slag having one or more reactive silicate compounds.

In certain embodiments, the first component comprises a material selected from the group consisting of: cement kiln dust (CKD), lime kiln dust (LKD), sugar beet lime, clinker dust, slaked lime, quick lime, and mixtures thereof. In some embodiments, the second component comprises a material selected from the group consisting of blast furnace slag, steel slag, and mixtures thereof. Examples of suitable slag material include: air cooled blast furnace slag, granulated blast furnace slag, ground granulated blast furnace slag, expanded and/or pelletized blast furnace slag, basic oxygen furnace steel slag, open hearth furnace steel slag, electric arc furnace steel slag, and any mixtures thereof. The second component may optionally comprise a stainless steel slag derived from a furnace manufacturing and/or processing stainless steel. In certain embodiments, the first component comprises cement kiln dust (CKD) and the second component comprises a stainless steel slag. In various aspects, the methods produce a product comprising calcium carbonate and spent scrubbing material. In certain embodiments, the calcium carbonate product is recycled as a raw material in an industrial process. One example of such recycling is using the calcium carbonate product as a raw material for cement manufacturing or lime manufacturing. The calcium carbonate product may optionally be used as a flux material in iron and/or steel processing.

In various aspects, a carbon-dioxide sequestration material slurry is provided for scrubbing carbon-dioxide from a carbon-dioxide containing fluid stream. The slurry comprises a first component, a second component, and water. The first component comprises one or more materials selected from the group consisting of: cement kiln dust, lime kiln dust, sugar beet lime, clinker dust, quick lime, slaked lime, and mixtures thereof. The second component comprises a slag having a source of reactive silicates. The slurry comprises particles having an average maximum particle size of less than or equal to about 500 μm and an average surface area of greater than or equal to about 1000 $cm^2/g$.

In yet other embodiments, a carbon-dioxide sequestration material is provided in the form of a slurry for scrubbing carbon-dioxide from a carbon-dioxide containing fluid stream. The slurry comprises a first component comprising cement kiln dust (CKD) and a second component comprising a slag having a source of reactive silicates. The slurry also comprises water. The slurry comprises particles having an average maximum particle size of less than or equal to about 500 μm and an average surface area of greater than or equal to about 1000 $cm^2/g$.

In another aspect, the disclosure provides a carbon-dioxide emission abatement system. The system comprises a reaction chamber. The reaction chamber has a fluid inlet, a slurry inlet, a mixing zone, a fluid outlet, and a slurry outlet. A carbon-dioxide containing effluent stream is in fluid communication with the reaction chamber and is introduced to the reaction chamber via the fluid inlet. Further, a source of slurry is in fluid communication with the reaction chamber. A slurry from the source of slurry is introduced to the reaction chamber via the slurry inlet. Moreover, the mixing zone provides turbulent mixing of the slurry and the effluent stream. The reaction chamber has a volume such that it provides a sufficient residence time to treat the effluent stream to reduce an amount of carbon dioxide by at least about 30%. The slurry comprises a first component comprising a source of calcium oxide and a source of alkali metal ions, a second component comprising a slag having a source of reactive silicates, and water. A spent slurry and/or a calcium carbonate product is removed from the reaction chamber via the slurry outlet.

In other embodiments, a method of recycling industrial byproducts is provided. A carbon dioxide scrubbing material is formed by admixing a first manufactured component with a second manufactured component. The first component comprises a source of calcium oxide and a source of alkali metal ions. The second component comprises a slag having one or more reactive silicate compounds. An effluent stream generated in an industrial process comprising carbon dioxide is then contacted with the scrubbing material. A product comprising calcium carbonate is generated that is capable of beneficial reuse such as in an industrial process. In certain embodiments, after the contacting and after the generating, the scrubbing material is spent and at least a portion of the spent scrubbing material is admixed with fresh first manufactured component and fresh second manufactured component.

In various other aspects, the disclosure provides methods of reducing carbon dioxide emissions from effluent streams generated by stationary combustion sources (e.g., boilers, incinerators), cement kilns, lime kilns, iron furnaces and steel furnaces. In this manner, various aspects of the disclosure provide an effective means for removing carbon dioxide emissions, thus controlling greenhouse gas emissions, while further recycling at least one industrial byproduct, and preferably multiple byproduct materials, to form a useful product.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
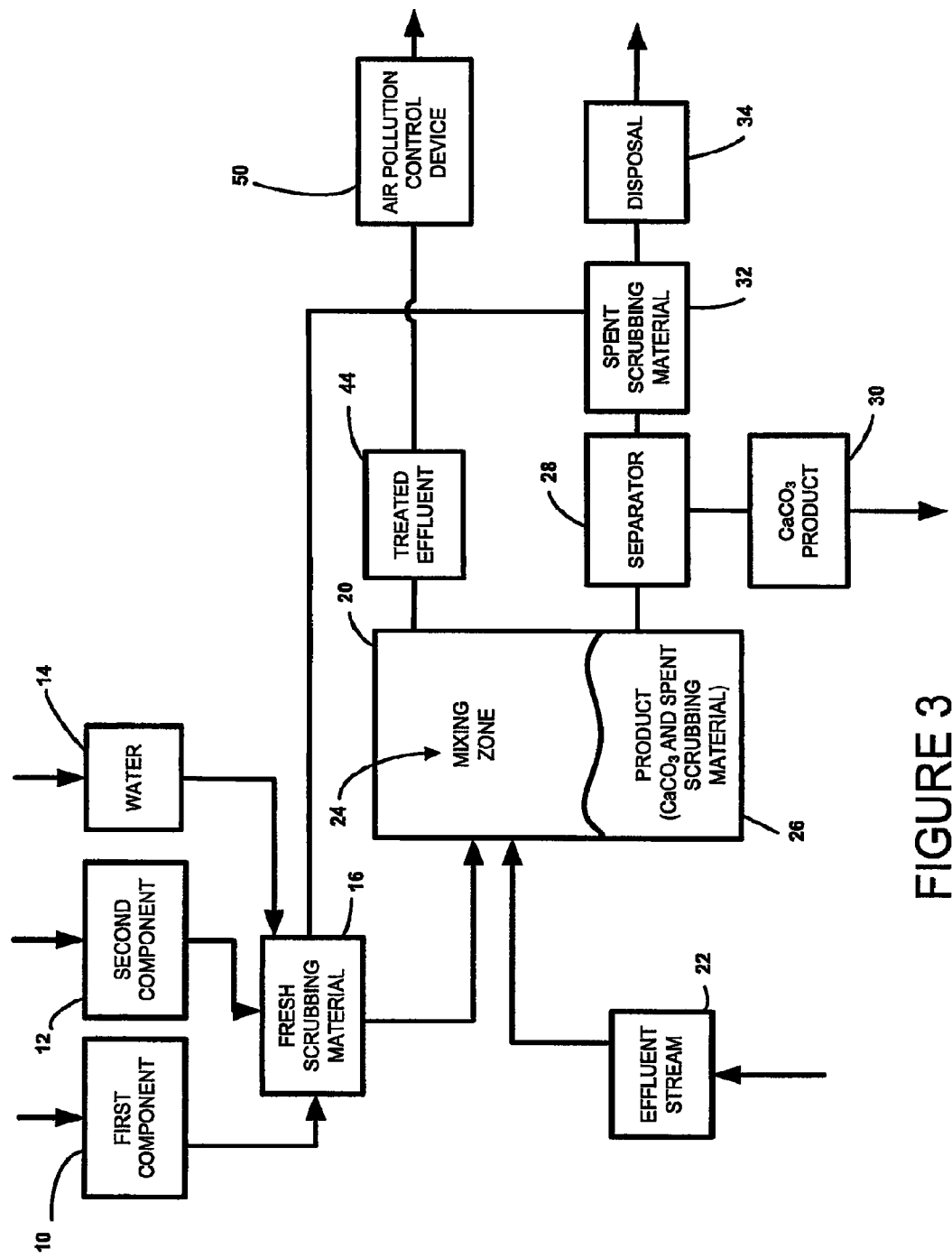
Figure 4:
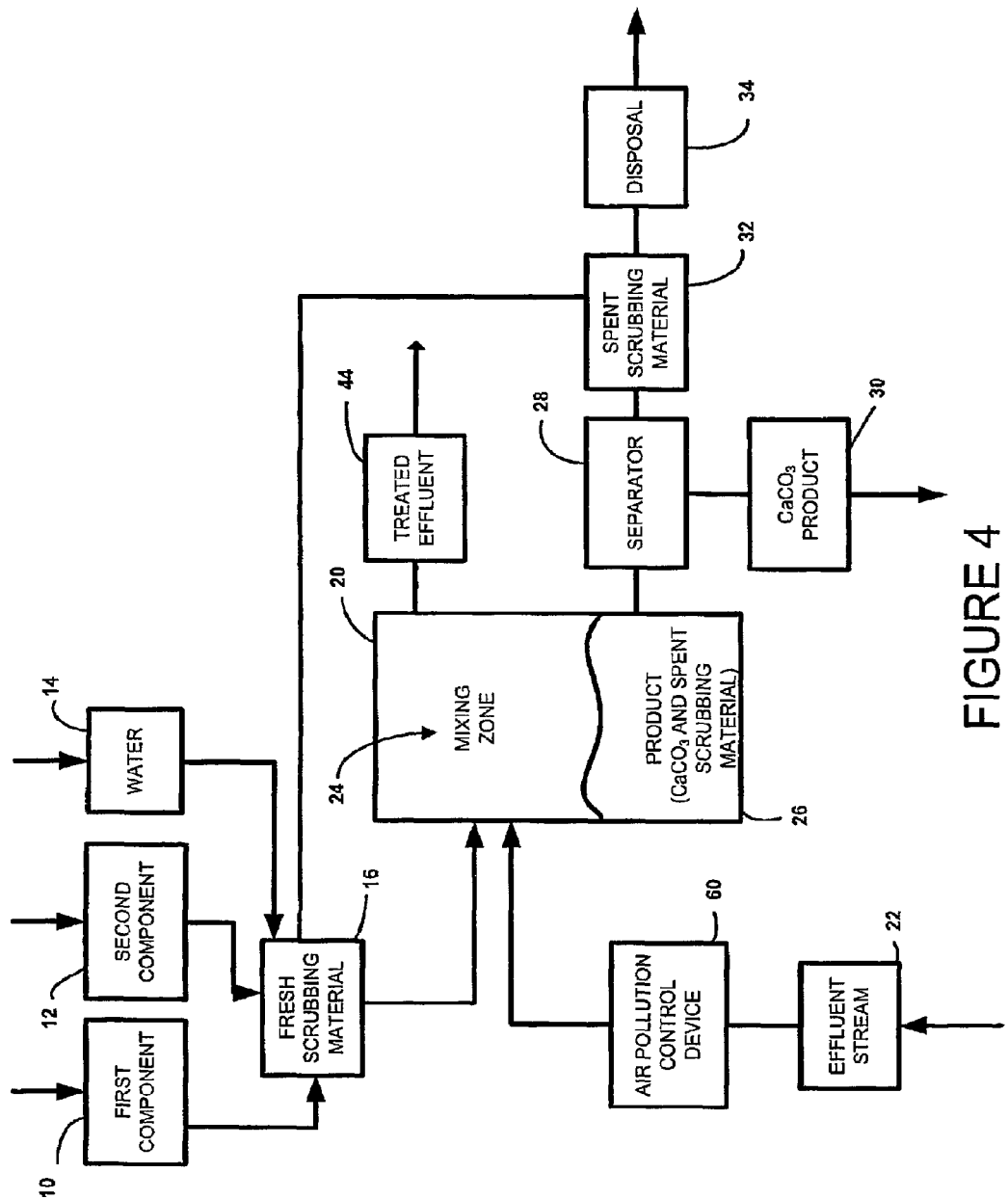

FIG. 3 is a process flow diagram for certain embodiments of the disclosure showing a carbon dioxide removal system, where a treated effluent stream exiting a carbon dioxide removal device is further treated with an air pollution control device to remove one or more additional pollutants other than carbon dioxide; and FIG. 4 is a process flow diagram for certain other embodiments of the disclosure showing a carbon dioxide removal system, where an effluent stream is pre-treated by an air pollution control device to remove one or more pollutants prior to entering a carbon dioxide removal device.

DETAILED DESCRIPTION

The following description is merely exemplary in nature and is not intended to limit the present disclosure, application, or uses. It should be understood that throughout the drawings, corresponding reference numerals indicate like or corresponding parts and features.

In various aspects, the teachings of the disclosure provide a process for reducing an amount of gaseous carbon dioxide present in a fluid stream by sequestering or scrubbing carbon dioxide from the gas phase of the fluid stream. In certain embodiments, the fluid stream comprises a gas and/or vapor, but may also have entrained solids and/or liquids, such as entrained particulates, liquid droplets and/or aerosols. In various embodiments, the fluid stream is an effluent stream or an exhaust stream generated in an industrial process. The fluid stream is contacted with a carbon dioxide scrubbing or sequestration material to remove carbon dioxide. After contact with the scrubbing material, the amount of carbon dioxide present in the fluid stream is reduced. In certain embodiments, the carbon dioxide reacts with the scrubbing material to form a useful product that will be described in more detail below.

In various aspects, the scrubbing material comprises a first component, a second component and water. The first component is distinct from the second component. In various embodiments, the first component comprises a source of calcium oxide and a source of alkali metal ions. The second component comprises a slag having one or more reactive silicate compounds. The scrubbing material reacts with carbon dioxide to form a product comprising calcium carbonate and spent scrubbing material.

In various embodiments, the first component of the scrubbing material comprises calcium oxide (CaO). Further, it is preferred that the first component also comprises a source of alkali metal ions, such as sodium and/or potassium ions, for example. In certain embodiments, the first component comprises a material that is generated or manufactured in an industrial process. As will be described in more detail below, some embodiments employ a beneficial reuse for waste materials that would otherwise be discarded, stockpiled, or landfilled. However, various suitable sources of calcium oxide and alkali metal ions may be naturally occurring materials, such as minerals, or may be manufactured commercial products. In various aspects, the first component comprises a material selected from the group consisting of cement kiln dust, lime kiln dust, sugar beet lime, clinker dust, slaked lime, quick lime, and any mixtures thereof. Such mixtures encompass any combination of two or more components. In certain embodiments, the first component comprises a material selected from the group consisting of cement kiln dust, lime kiln dust, sugar beet lime, and mixtures thereof. In other embodiments, the first component comprises lime kiln dust. In certain embodiments, the first component comprises cement kiln dust. Such non-limiting materials are suitable sources of calcium oxide and alkali metal ions for use in the scrubbing materials. The first component can comprise other sources of calcium oxide and alkali metal ions, including by way of example, waste water treatment plant sludge, pulp and paper sludge, calcium carbide manufacturing byproducts, and other materials providing calcium oxide and alkali metal ions, as are well known to the skilled artisan.

As appreciated by one of skill in the art, many of the sources of calcium oxide and alkali metal ions can have varied compositions, depending on the particular process in which they are made; the specific compositions of raw materials and fuels that are employed to manufacture the source; the conditions and duration that the material is stored or stockpiled; as well as a variety of other factors.

In this regard, in some embodiments, the first component preferably comprises one or more active ingredients selected from the group consisting of: CaO, $K_2O$, $Na_2O$, and mixtures thereof. In certain embodiments, the first component comprises one or more active ingredients selected from the group consisting of: CaO, $Na_2O$, $K_2O$, and mixtures thereof, where a total amount of the active ingredients present in the scrubbing material is at about 30% to about 60% by weight. The first component optionally comprises additional active compounds in addition to the calcium oxide and alkali oxides and such active ingredients are not restricted to those recited above.

In certain aspects, the first component comprises calcium oxide (CaO) at greater than or equal to about 30% by weight. As used herein, all percentages are on a weight basis, unless indicated as otherwise. It should be noted that the chemical compositions of various materials described herein are expressed in terms of simple oxides calculated from elemental analysis, typically determined by x-ray fluorescence techniques. While the various simple oxides may be, and often are, present in more complex compounds in the material, the oxide analysis is a useful method for expressing the concentration of compounds of interest in the respective compositions.

In some embodiments, the first component comprises free lime (free CaO) at greater than or equal to about 3% by weight. "Free lime" refers to the free calcium oxide (free CaO) readily available in a material for a hydration reaction with water. Unslaked lime, also referred to as quick lime, contains a high concentration of dehydrated (free) lime or calcium oxide (CaO) that can undergo reaction with water, i.e., slaking. In contrast, a slaked or hydrated lime has already been reacted with water to form $Ca(OH)_2$. Free lime content is often used as an indicator of the reactivity of the calcium oxide containing materials. In certain embodiments of the disclosure, the free lime may be about 5% or even greater.

In some embodiments, the first component preferably comprises an amount of alkali ion source in the form of sodium oxide ($Na_2O$) and/or potassium oxide ($K_2O$) at greater than or equal to about 1% by weight. It should be noted that some alkali metal ions complex with various complex anions, such as sulfates, however, a typical analysis of alkali content expresses the alkali metal oxides and sulfates individually. In certain embodiments, the amount of alkali ion source in the form of sodium oxide ($Na_2O$) and/or potassium oxide ($K_2O$) is greater than or equal to about 3% by weight; optionally greater than or equal to about 4% by weight. The alkali content of various pozzolanic and/or cementitious materials can also be expressed as a sodium equivalent ($Na_2O_e$) which accounts for the presence of both $Na_2O$ and $K_2O$ calculated by the equation $$z = x + (0.658 \cdot y) \quad \text{(EQN. 1)}$$

where z is the sodium equivalent $Na_2O_e$, x is the weight percent of $Na_2O$ present in the composition, and y is the weight percent of $K_2O$ present in the composition. Such sodium equivalents $Na_2O_e$ may range from greater than 0.01%, to greater than or equal to about 1% by weight, optionally greater than or equal to about 2% by weight, optionally greater than or equal to about 3% by weight, and in some embodiments, greater than or equal to about 5% by weight.

As will be discussed in greater detail below, the alkali metal ions promote desirable reaction conditions for the scrubbing material, such as providing a high pH that is believed to provide a faster rate of reaction and to favor formation of preferred products in the scrubbing material reaction with carbon dioxide.

In certain embodiments, the first component has a composition as set forth in Table I, exclusive of impurities and diluents.

TABLE I

| Oxide | Approximate Weight % |
|---|---|
| Calcium Oxide (CaO) | 30-45 |
| Silica ($SiO_2$) | 10-20 |
| Aluminum Oxide ($Al_2O_3$) | 2-7 |
| Iron Oxide ($Fe_2O_3$) | 1-3 |
| Magnesium Oxide (MgO) | 0.5-3 |
| Sulfate ($SO_3$) | 1-15 |
| Sodium Oxide ($Na_2O$) | 0.1-1 |
| Potassium Oxide ($K_2O$) | 0.1-15 |

In some embodiments, the first component preferably comprises cement kiln dust (CKD), which generally refers to a byproduct generated within a cement kiln or related processing equipment during Portland cement manufacturing. Portland cement can be manufactured in a wet or a dry process kiln. While the wet and dry processes differ, both processes heat the raw material in stages. Cement manufacturing raw materials comprise sources of calcium, silica, iron, and alumina, and usually include limestone, as well as a variety of other materials, such as clay, sand and/or shale, for example.

The first stage of cement manufacturing is a pre-heating stage that drives off any moisture from the raw materials, removes water of hydration, and raises the material temperature up to approximately 1500° F. (approximately 800° C.). The second stage is the calcination stage which generally occurs between about 1500° F. and 2000° F. (approximately 1100° C.), where the limestone ($CaCO_3$) is converted to lime (CaO) by driving off carbon dioxide ($CO_2$) in a calcination reaction. The raw materials are then heated to a maximum temperature of between about 2500° F. to 3000° F. (approximately 1400° C. to 1650° C.) in the burning zone, where they substantially melt and flux, thus forming inorganic compounds, such as tricalcium silicate, dicalcium silicate, tricalcium aluminate, and tetracalcium aluminoferrite. A typical analysis of portland cement products shows that they contain approximately 65-70% CaO, 20% $SiO_2$, 5% $Al_2O_3$, 4% $Fe_2O_3$, with lesser amounts of other compounds, such as oxides of magnesium, sulfur, potassium, sodium, and the like. The molten raw material is cooled to solidify into an intermediate product in small lumps, known as "clinker" that is subsequently removed from the kiln. Clinker is then finely ground and mixed with other additives (such as a set-retardant, gypsum) to form Portland cement, which can then be mixed with aggregates and water to form concrete.

Generally, CKD comprises a combination of different particles generated in different areas of the kiln, pre-treatment equipment, and/or material handling systems, including for example, clinker dust, partially to fully calcined material dust, and raw material (hydrated and dehydrated) dust. As appreciated by those of skill in the art, the composition of the CKD varies based upon the raw materials and fuels used, the manufacturing and processing conditions, and the location of collection points for CKD within the cement manufacturing process. CKD can include dust or particulate matter collected from kiln effluent (i.e., exhaust) streams, clinker cooler effluent, pre-calciner effluent, air pollution control devices, and the like. Clinker cooler dust refers to dust collected in the clinker cooler areas of the kiln and typically has a chemical composition that is very similar to Portland cement.

While CKD compositions will vary for different kilns, CKD usually has at least some cementitious and/or pozzolanic properties, due to the presence of the dust of clinker and calcined materials. Typical CKD compositions comprise silicon-containing compounds, such as silicates including tricalcium silicate, dicalcium silicate; aluminum-containing compounds, such as aluminates including tricalcium aluminate; and iron-containing compounds, such as ferrites including tetracalcium aluminoferrite. CKD generally comprises relatively high amounts of calcium oxide (CaO). Exemplary CKD compositions comprise calcium oxide at about 10 to about 60% by weight, optionally about 25 to about 50% by weight, and optionally about 30 to about 55% by weight. In some embodiments, CKD comprises a concentration of free lime of about 1 to about 10%, optionally of about 1 to about 5%, and in some embodiments about 3 to about 5%. Further, CKD typically comprises sodium and potassium alkali metal ions respectively at about 0.1 to about 10% by weight, and optionally about 0.2 to about 5% by weight. CKD may comprise additional alkali metal ions, alkaline earth metal ions, and sulfur, inter alia. CKD also typically comprises silica ($SiO_2$) at about 10 to about 20% by weight, alumina ($Al_2O_3$) at about 2 to about 7% by weight, and iron oxide ($Fe_2O_3$) at about 1 to about 3% by weight.

Exemplary CKD dusts have specific gravity ranges from about 2.6 to 2.8, a maximum particle size of about 0.30 mm (300 µm) and Blaine fineness (specific surface area) ranging from about 4,600 to about 14,000 $cm^2/g$.

In certain embodiments, the first component of the scrubbing material of the disclosure comprises lime (i.e., quick lime) or lime kiln dust (LKD). LKD is a byproduct from the manufacturing of lime. LKD is dust or particulate matter collected from a lime kiln or associated processing equipment. Manufactured lime can be categorized as high-calcium lime or dolomitic lime, and LKD varies based upon the processes that form it. Lime is often produced by a calcination reaction conducted by heating calcitic raw material, such as calcium carbonate ($CaCO_3$), to form free lime CaO and carbon dioxide ($CO_2$). High-calcium lime has a high concentration of calcium oxide and typically some impurities, including aluminum-containing and iron-containing compounds. High-calcium lime is typically formed from high purity calcium carbonate (about 95% purity or greater). Typical calcium oxide content in an LKD product derived from high-calcium lime processing is similar to the concentration of calcium oxide in the lime product itself, and can be greater than or equal to about 75% by weight, optionally greater than or equal to about 85% by weight, and in some cases greater than or equal to about 90% by weight. In some lime manufacturing, dolomite ($CaCO_3.MgCO_3$) is decomposed by heating to primarily generate calcium oxide (CaO) and magnesium oxide (MgO), thus forming what is known as dolomitic lime. In lime or LKD generated by dolomitic lime processing, calcium oxide can be present at greater than or equal to about 45% by weight, optionally greater than or equal to about 50% by weight, and in certain embodiments, greater than or equal to about 55% by weight. While both lime and LKD vary based upon the type of lime processing employed, they generally have relatively high concentrations of free lime. Typical amounts of free lime in such lime or LKD products are about 10 to about 50%, optionally about 20 to about 40%.

Further, LKD and lime products typically comprise sodium and potassium alkali metal ions at respective amounts of about 0.01 to about 1% by weight, and optionally about 0.03 to about 0.25% by weight. Lime and/or LKD may comprise additional alkali metal ions, alkaline earth metal ions (such as the MgO described above), and sulfur, inter alia. LKD also comprises silica ($SiO_2$) at about 1 to about 10% by weight, alumina ($Al_2O_3$) at about 0.1 to about 5% by weight, and iron oxide ($Fe_2O_3$) at about 0.5 to about 2% by weight. Exemplary LKDs have specific gravity ranging from about 2.6 to 3.0, a maximum particle size of about 2 mm (2,000 µm) and Blaine fineness (specific surface area) ranging from about 1,300 to about 10,000 $cm^2/g$.

Another exemplary material for use as a first component of the scrubbing material of the present disclosure is a sugar refining lime byproduct. Lime is used in the production of sugar derived from sugar cane, sugar beets, maple sap and sorghum. For example, sugar cane and sugar beets are harvested and processed with water to form raw juice, which has low pH and contains dissolved impurities. The sugar juice thus contains sucrose, pulp, various non-sugars, e.g., organic and inorganic salts, amino acids, dyes and high molecular substances, such as protein and pectin. Hydrated lime is added to the juice to raise the pH and to react with the impurities to form insoluble calcium organic compounds that can be removed. In a conventional sugar purification method, lime (CaO) and carbon dioxide ($CO_2$) are added, which results in the formation of a precipitate (sludge) consisting of calcium carbonate and part of the above-mentioned non-sugar components. The dewatered sludge comprises calcium oxide (CaO), usually in hydrated form (Ca(OH)$_2$). The sugar juice may be further successively refined in this manner. Sugar beets tend to require the greatest amount of refinement with lime, and the sludge byproduct is generally referred to as "sugar beet lime." However, the use of the term "sugar beet lime" is merely representative of the class of the sugar processing lime byproducts that are suitable for use in the scrubbing materials of the disclosure.

In sugar beet lime, calcium oxide can be present at greater than or equal to about 25% by weight, optionally greater than or equal to about 30% by weight, and in certain embodiments, greater than or equal to about 40% by weight. Sugar beet lime also typically comprises alkali metal ions, such as sodium and potassium, respectively present at about 0.01% by weight or greater; optionally greater than or equal to about 0.05% by weight, optionally greater than or equal to about 0.1% by weight, and in some embodiments greater than or equal to about 1% by weight of the composition.

Thus, the first component of the scrubbing material may comprise any suitable source of calcium oxide and alkali metal ions. The first component can optionally comprise a single suitable material or mixtures of suitable materials that provide calcium oxide and alkali metal ions at the desired concentrations.

Slag materials are industrial byproducts of metal manufacturing. In various embodiments, the second component of the scrubbing material comprises such a slag material that provides a reactive silicate. Silicates are typically in a tetrahedral form that can be joined in chains, double chains, sheets, three-dimensional networks, and other polymerization ("geopolymer") forms. A silicate comprises silicon and oxygen atoms with one or more metals and/or hydrogen. Generally, the silicon and oxygen are in the form of $Si_xO_y$, where x is generally 1 or 2 and y can range from 2 to 7 (i.e., $SiO_2$, $SiO_3$, $SiO_4$, and $Si_2O_7$). While many silicates are insoluble or stable in water, it is believed that basic conditions and increased temperatures facilitate greater solubility and/or reactivity of certain silicate compounds in the presence of water. The water solubility and/or reactivity of the silicate compound in the presence of water depends upon numerous factors, including the cations with which the silicate anion is complexed (for example, Group IA alkali metal ion elements and $NH_4^+$ tend to form water soluble silicates).

Certain silicate species are more reactive with ionic species and may exhibit higher solubility in water, where such silicates are believed to ionize to form $SiO^-$ ions. For example, silicates can form various crystal structures, ranging from crystalline and highly-ordered phases (for example quartz) to crypto-crystalline phases (for example, extremely fine crystalline structures like chalcedony) to amorphous phases or glassy non-crystalline structures (for example, opal). It is believed that amorphous lattice structures permit higher ionic attack and breakdown of the silicate network. Thus, highly ordered and well-crystallized phases are stable and non-reactive, as where crypto-crystalline and amorphous silicate lattices are susceptible to attack due to disordered and open lattice structures, hence such silicates are reactive.

In accordance with various embodiments of the disclosure, the second component of the scrubbing material comprises reactive silicates. While not limiting as to any theory by which the present teachings operate, it is believed that certain crystalline phases of dicalcium silicate (2 $CaO.SiO_2$ typically expressed in shorthand as $C_2S$) and tricalcium silicate (3 $CaO.SiO_2$ typically expressed in shorthand as $C_3S$), in particular the $\gamma$-$C_2S$, $\beta$-$C_2S$, and $C_3S$ crystalline phases, are reactive silicates that can be formed in slag materials, and thus suitably react with carbon dioxide in the presence of water.

By reactive silicate compound, it is meant that more than 10% of the total silicate compounds present in a material will react with carbon dioxide in the presence of water at 25° C. (77° F.) and ambient pressure at pH of greater than or equal to about 9.

Further, in accordance with various embodiments of the disclosure, such silicate compounds have higher reactivity in water when pH is basic. Preferably, the pH of the scrubbing material is greater than or equal to about 7, more preferably greater than or equal to about 9, and in some embodiments about 11 up to about 14 to enhance the solubility of silicate compound. Practically, the pH in such systems does not usually exceed about 13. Increased temperatures also increase solubility of silicate compounds in water. In accordance with various embodiments of the disclosure, it is preferred that the slag of the second composition comprises greater than or equal to about 5% reactive silicates, optionally greater than or equal to about 10%; optionally greater than or equal to about 15% of reactive silicates by weight.

Various slag materials comprise calcium silicates. Preferably, at least a portion of these calcium silicates are reactive with carbon dioxide and/or calcium oxide in the presence of water in the scrubbing materials of the various embodiments of the disclosure. As described above, the first component of the scrubbing material preferably comprises both a source of calcium oxide and alkali metal ions, which provide an alkaline or basic pH in the scrubbing material to enhance the solubility of the reactive silicate compounds.

By way of background, slags are generally byproduct compounds generated by metal manufacturing and processing. The term "slag" encompasses a wide variety of byproduct materials, typically comprising a large portion of the non-metallic byproducts of ferrous metal and/or steel manufacturing and processing. Generally, slagging agents, or flux materials, are added to furnaces to strip impurities from the molten iron ore, steel scrap, iron and/or steel feed stock during processing. Typical flux materials are limestone ($CaCO_3$) and/or dolomite ($CaCO_3.MgCO_3$). Molten slag forms as a silicate melt floating to the top of the furnace that cools to form complex silicates and oxides. The composition of slag is dependent upon the metal being processed in the furnace and often contains metal sulfides and metal atoms in an elemental form. The composition and properties of the slag also vary based on the type of furnace and the post-processing treatment, which can affect not only the chemical composition, but the crystallinity, phase development, and surface morphology that can impact reactivity. For example, as discussed above, it is preferred that one or more reactive silicate phases are formed in the slag, such as $\gamma$-$C_2S$, $\beta$-$C_2S$, and $C_3S$. Further, the particle size, porosity, and surface area of the slag impacts the reactivity, as lower particle size, higher porosity and hence higher surface area materials enable greater exposure to $CO_2$ and water to facilitate greater reaction.

Blast furnaces process iron ore to form refined pig iron. Blast furnace slags are generally formed into three main types: air-cooled, granulated, and pelletized (or expanded). Air-cooled blast furnace slag is formed by allowing the molten slag to cool relatively slowly under ambient conditions, while the final cooling can be accelerated with a cooling process, such as water spray. Granulated slag is formed by quenching molten slag in water, thus forming small disordered-structure glass particles. Such granulated slag is often further ground, thereby enhancing the cementitious properties of the material. Pelletized or expanded slag is cooled through a water jet, which leads to rapid steam generation that develops extensive vesicle structures in the material.

Steel slags are formed during the further processing of pig iron and other steel materials in steel-making furnaces. Typical steel furnaces include basic oxygen process furnaces (BOF), open hearth furnaces (OHF), and electric arc furnaces (EAF). Most steel is now made in integrated steel plants using a version of the basic oxygen process or in specialty steel plants that use an electric arc furnace process. Open hearth furnace processes are less prevalent. In an exemplary basic oxygen process, hot liquid blast furnace metal, scrap, and fluxes are charged to a converter (furnace). A lance is lowered into the converter and high-pressure oxygen is injected. The oxygen combines with and removes the impurities in the charge. These impurities consist of carbon as gaseous carbon monoxide, and silicon, manganese, phosphorus and some iron as liquid oxides, which combine with lime and/or dolomite to form the steel slag. At the end of the refining operation, the liquid steel is poured into a ladle while the steel slag is retained in the vessel and subsequently tapped into a separate slag pot.

Many different grades of steel can be produced and the properties of the steel slag can change significantly with each grade. Grades of steel can be classified as high, medium, and low, depending on the carbon content of the steel. High-grade steels have high carbon content. To reduce the amount of carbon in the steel, greater oxygen levels are required in the steel-making process. This also requires the addition of increased levels of flux material for the removal of impurities from the steel and increased slag formation.

Steel furnace slag typically contains much higher amounts of dicalcium silicate and calcium oxide. There are several different types of steel slag produced during the steel-making process, including furnace (or tap) slag, raker slag, synthetic (or ladle) slags, and pit (or cleanout) slag. The steel slag produced during the primary stage of steel production is referred to as furnace slag or tap slag. After being tapped from the furnace, the molten steel is transferred in a ladle for further refining to remove additional impurities still contained within the steel, which generates additional steel slags by again adding fluxes to the ladle to melt. These slags are combined with any carryover of furnace slag and assist in absorbing deoxidation products (inclusions), heat insulation, and protection of ladle refractory. The steel slags produced at this stage of steel making are generally referred to as raker and ladle slags. Pit slag and clean out slag are other types of slag commonly found in steel-making operations. They usually consist of the steel slag that falls on the floor of the plant at various stages of operation, or slag that is removed from the ladle after tapping. The ladle refining stage usually involves comparatively high flux material addition and the properties of these synthetic slags are often significantly different from those of the furnace slag. Such slags are often rich in calcium oxide and silicates and are well suited as a material for the second component of the scrubbing material, particularly as these synthetic slags cannot generally be recycled as aggregates due to expansion in situ.

It should be noted that the second component may comprise a combination of slags originating from different locations of the furnace and/or processing or may include combinations of slags from different furnaces or processes. The term furnace encompasses both iron ore and steel converters. Generally, blast furnace slags refer to those generated in iron ore furnaces and steel slags are those generated by any steel forming or refining process, including stainless steel slags, as will be described in more detail below. Depending on the location from which they originate in the process and subsequent processing, many of the slags have different particle size distributions, different mineralogy and crystal formation. These slags may be further ground to achieve desirable particle size distributions and/or fineness (surface area).

Exemplary slags comprise calcium-containing compounds, silicon-containing compounds, aluminum-containing compounds, magnesium-containing compounds, iron-containing compounds, manganese-containing compounds and/or sulfur-containing compounds. In certain embodiments of the disclosure, the slag material(s) of the second component are selected to comprise calcium oxide at about 25 to about 60%, optionally about 30 to about 50%, and optionally about 30 to about 45% by weight. In various embodiments, the second component comprises silicon dioxide ($SiO_2$) at greater than or equal to about 25% by weight; optionally greater than or equal to about 30% by weight; optionally greater than or equal to about 35% by weight. It should be noted that the amount of $SiO_2$ present in the composition is reflective of the simple oxide analysis (as discussed above in the context of the first component) and does not necessarily reflect the concentration of reactive silicates, which may only form a portion of the total amount of $SiO_2$ present in the material. In certain embodiments, the second component further comprises calcium oxide (CaO) at greater than or equal to about 25%; optionally greater than or equal to about 30% by weight; optionally greater than or equal to about 35% by weight. As discussed above, the calcium oxide and silicon oxide are typically present in the form of calcium silicates, however, based on the overall simple oxide analysis, are present at respective amounts of greater than or equal to about 25% by weight. In certain embodiments, the second component comprises one or more active ingredients selected from $CaSiO_3$, CaO, and mixtures thereof, where a total amount of the active ingredient present in the second component is about 35 to about 90% by weight.

In certain embodiments, the second component comprising a slag has a composition as set forth in Table II, exclusive of impurities and diluents.

TABLE II

| Oxide/Metal | Approximate Weight % |
| --- | --- |
| Calcium Oxide (CaO) | 35-55 |
| Silica ($SiO_2$) | 10-35 |
| Aluminum Oxide ($Al_2O_3$) | 0.1-10 |
| Iron Oxide (FeO) (70-80% FeO & 20-30 $Fe_2O_3$) | 0.1-40 |
| Magnesium Oxide (MgO) | 3-10 |
| Manganese Oxide (MnO) | 3-10 |
| Sulfate ($SO_3$) | 0.01-15 |
| Phosphate ($P_2O_5$) | 0.01-1 |
| Metallic Iron | 0.5-10 |

One example of a suitable slag generally having cementitious properties and reactive silica is ground granulated blast furnace slag (GGBFS). The cooling rate of slag is typically sufficiently low so that various crystalline compounds are generally formed, including predominant compounds such as dicalcium silicate, tricalcium silicate, dicalcium ferrite, meriwinite, calcium aluminate, calcium-magnesium iron oxide, free lime, and free magnesia. The free lime and magnesia are believed to be responsible for expansion of most steel slags when they exposed to moisture, typically making them unsuitable for many applications, such as aggregates. However, in the context of the present disclosure, these otherwise undesirable materials can be recycled and employed for a beneficial use.

Stainless steel slags are particularly preferred materials for the second component of certain embodiments of the disclosure, as they typically comprise higher concentrations of free lime and/or free magnesia, and relatively high concentrations of silicates, particularly in the reactive silicate crystalline form of γ-$C_2S$. During crystal development and phase transition, this γ-$C_2S$ phase is believed to cause instability in the $C_2S$ crystal lattice that causes fragmentation to fine powder form due to self-pulverization.

As appreciated by those of skill in the art, varying amounts of elements, such as nickel, chromium, molybdenum, and manganese, can be added to refined iron to form steel: the greater the amounts of these elements that are included, the higher the grade of steel. These elements tend to be incorporated into the compounds present in the slag that is used to refine the metals. In general, stainless steel contains at least about 10.5% chromium. A typical austenitic steel has chromium at greater than or equal to about 16% and nickel at greater than or equal to about 8%. Stainless steel comprises carbon up to about 1.7% by weight. Higher grades of stainless steel usually have lower carbon contents and may contain molybdenum and manganese, inter alia. By way of example, a low Grade 304 austenitic stainless steel has carbon (C) at less than or equal to 0.08%, chromium (Cr) from between about 17 to 19.5%, nickel (Ni) from about 8 to 10.5%, manganese (Mn) at less than or equal to about 2%, with no molybdenum (Mo). Another exemplary higher grade steel is 316L where carbon (C) is present at less than or equal to 0.03%, chromium (Cr) at about 17%, nickel (Ni) at about 9%, manganese (Mn) at about 2%, and molybdenum (Mo) at about 2.5%. "L" designates low carbon content. A higher grade austenitic stainless steel is Grade 317LMN that has carbon (C) at less than or equal to 0.03%, chromium (Cr) from between about 16.5 to 18.5%, nickel (Ni) from about 13.5 to 17.5%, manganese (Mn) from about 1 to 2%, and molybdenum (Mo) from about 4 to 5%. In the 317LMN grade, the "M" and "N" designations indicate that the composition contains increased levels of molybdenum and nickel respectively. Stainless steel slags tend to incorporate these various elements and further comprise a high amount of reactive and/or water soluble silicates, which are highly desirable for scrubbing materials in various embodiments of the disclosure.

The second component can further comprise other sources of reactive silicates, in addition to the slag described above, so long as they contribute desirable and/or necessary active ingredients discussed above. For example, other suitable examples include blast (cupola) furnace dust collected from air pollution control devices attached to blast furnaces, such as cupola arrester filter cake. Another suitable industrial byproduct source is paper de-inking sludge ash. As recognized by those of skill in the art, there are many different manufactured/industrial process byproducts that are feasible as a source of reactive silicates of the scrubbing material of the disclosure. Many of these well known byproducts comprise alumina and/or silica, as well. Combinations of any of the exemplary manufactured products and/or industrial byproducts are contemplated for use in certain embodiments of the disclosure.

Thus, the scrubbing materials of the disclosure comprise the first component comprising a source of calcium oxide and a source of alkali metal ions and the second component comprises a slag comprising reactive silicates. In certain embodiments, a ratio of the first component to the second component in the scrubbing material is about 10:1 to about 1:10. In certain embodiments, a ratio of the first component to the second component in the slurry is about 3:4 to about 4:3. While not limiting to any particular theory, it is believed that an increased rate of reaction and a higher reaction conversion of carbon dioxide with calcium oxide and silicates occurs in a scrubbing material when the molar amount of available calcium is higher that available silicon. Thus, where active ingredients in the scrubbing material are calcium oxide and silicon dioxide, a molar ratio of calcium (Ca) to silicon (Si) in the scrubbing material is preferably about 1:1 to about 10:1 in certain embodiments to facilitate reaction with carbon dioxide.

The scrubbing materials of various embodiments preferably comprise water. The water facilitates transport, solubilization, and ionization of the various active compounds of the present disclosure. In various embodiments, the scrubbing material is provided in the form of a slurry. Slurry is formed by combining water with the first and second components described herein. A slurry is a mixture of soluble compounds and suspended insoluble particles. The amount of water in the slurry ranges from 5% or 10% on the low side up to 90% or 95% by weight on the high side. In various embodiments, the slurry has a water content of greater than or equal to about 15% by weight or greater than or equal to about 20% by weight; in certain embodiments greater than or equal to about 30% by weight; and in some embodiments greater than or equal to about 40% by weight. In certain embodiments, the water content of the scrubbing material is about 15% to about 85% by weight, and in exemplary embodiments the slurry contains from 20% to 85%, from 30% to 85%, from 40% to 85%, or from 50% to 85% by water. In various embodiments, the slurry contains 80% or less by weight water or 70% or less by weight water. As the water content increases, the viscosity of the slurry decreases, thus pumping and handling become easier. In certain aspects, the slurry has a viscosity that permits pumping and mass transport as a liquid through various parts of the system.

Where the scrubbing material is in a slurry form and has a relatively high water content, the mass transport of carbon dioxide from the gas stream to the liquid/solid phase of the slurry is enhanced, which is desirable, particularly in applications where the fluid stream has a high velocity. Further, the scrubbing materials of the present disclosure typically have cementitious and/or pozzolanic properties. As recognized by those of skill in the art, the amount of water present in a system dictates the amount of cementitious phase formation, hence the extent of strengthening, hardening, and agglomeration. For example, concrete preferably minimizes the water content to enhance strength and hardness, for example, water to Portland cement ratios in concrete preferably range from less than 0.35 to about 0.40, with a minimum amount of 0.25 required to complete the hydration reactions of cement compounds. A typical concrete composition is about 7 to 15% cement, 14 to 21% water and the remainder aggregates. For stabilization of wastes, full development of strength and hardness is desirable to prevent leaching of various metals. For such waste stabilization, it has been suggested that the water to solid ratio should be about 0.125 for appropriate setting and hardening reaction of reactive silicates. Thus, in the presence of relatively high amounts of water, the materials have less propensity to set, harden, and agglomerate. Hence, various embodiments of the disclosure provide relatively high water content, to prevent hardening, setting, and agglomeration, so that the materials are capable of circulating as a scrubbing material in a carbon dioxide abatement system.

In some embodiments, the scrubbing material handling system within the scrubber device may have agitation points. Further, certain embodiments may include centrifuges, filters, screens, and/or settling regions to remove any larger particles to prevent build-up of larger agglomerated particles in the scrubber material handling equipment and lines. In some embodiments, a plasticizing agent is employed to minimize potential agglomeration and to increase flowability of the scrubbing material. Suitable plasticizing agents include sugar (sucrose), superplasticizers used in concrete applications (such as polymeric plasticizers like polycarboxylate ethers, naphthalene and/or melamine based polymers and copolymers), and diesel fuel. Plasticizing agents are well known in the art and a variety of suitable compounds can be used in the scrubbing materials of the disclosure, including those known or to be developed in the art.

In certain embodiments, a carbon sequestration material slurry for scrubbing carbon-dioxide from a carbon-dioxide containing fluid stream consists essentially of a first component comprising one or more materials selected from the group consisting of: cement kiln dust, lime kiln dust, sugar beet lime, clinker dust, quick lime, slaked lime, and mixtures thereof. In such embodiments, the slurry further consists essentially of a second component comprising a slag having a source of reactive silicates and water as well. In certain embodiments, the slag is a stainless steel slag. In other embodiments of the disclosure, the scrubbing material may consist essentially of a first component comprising cement kiln dust and a second component comprising a slag having a source of reactive silicates and water, such as stainless steel slag.

In certain embodiments, the scrubbing material slurry comprises a first component at between about 15 to about 50% by weight, the second component at about 15 to about 50% by weight, and water at about 15 to about 50% by weight of the total scrubbing material composition.

In embodiments where the scrubbing material is in a slurry form, the slurry preferably comprises particles having an average maximum particle size of less than or equal to about 500 μm and an average surface area of greater than or equal to about 1000 $cm^2/g$. In some embodiments, the particles have an average surface area of greater than or equal to about 4,000 $cm^2/g$; optionally greater than or equal to about 7,000 $cm^2/g$, and in some embodiments greater than 10,000 $cm^2/g$. Further, the particles of the slurry have an average maximum particle size diameter of less than or equal to about 300 μm in some embodiments, and less than or equal to about 100 μm in other embodiments. Smaller particle sizes tend to have higher surface areas, which promotes reaction of the active ingredients, minimizes settling effects of the particles from suspension and minimizes clogging of handling and processing equipment. In this regard, the suspended particles have desirable characteristics for reaction with the carbon dioxide in the effluent stream and for transport and processing (preventing settling and the like). Such particle sizes and surface areas may be achieved by selecting the first component and second component to have these desired properties or by further processing the materials by milling or grinding, for example, by admixing the first and second components in a ball mill to reduce particle size. The slurry may also be processed in a mixer, agitator, pug mill, or slurry mill to achieve sufficient mixing of the first component, second component, and water.

Figure 1:
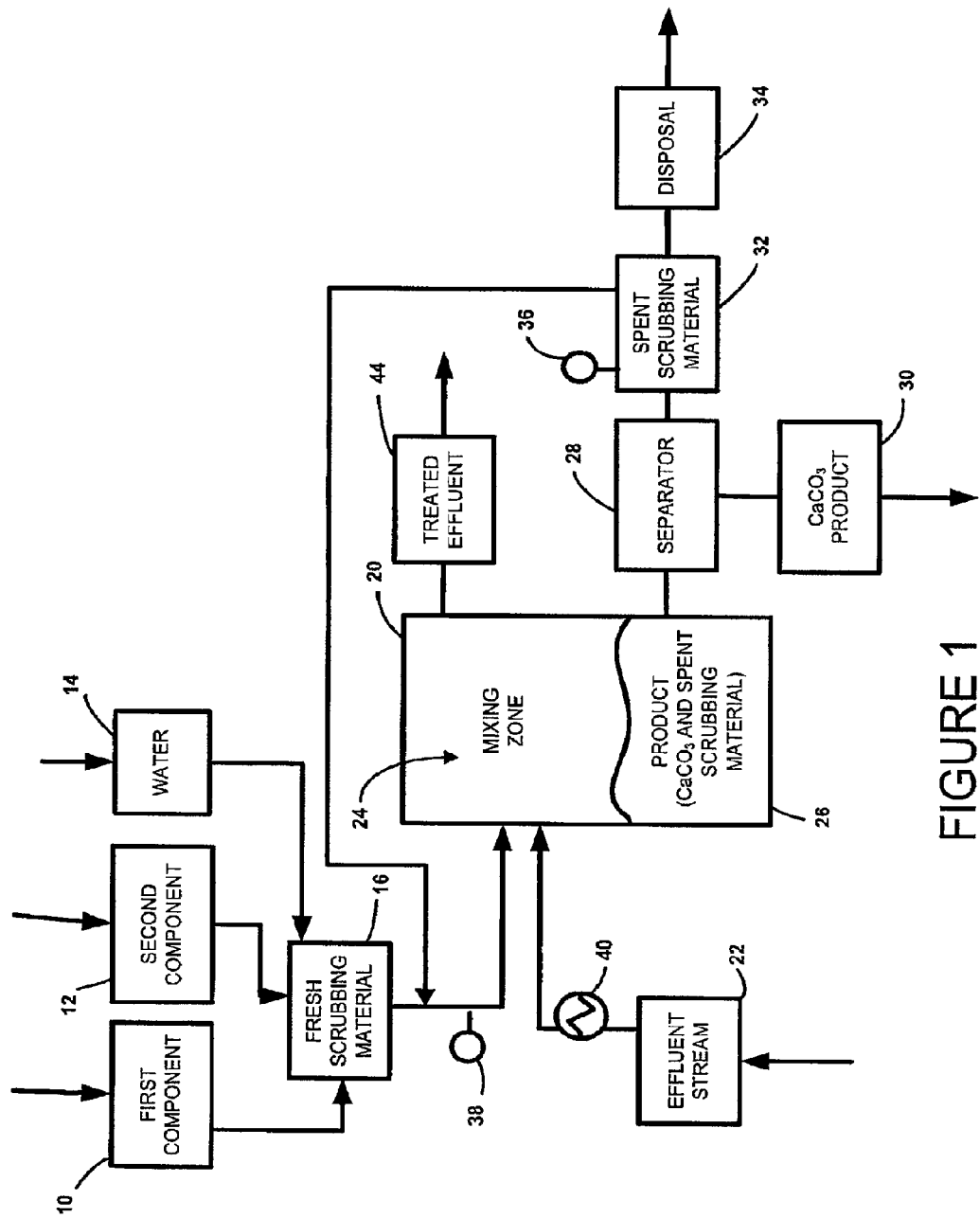
FIG. 1 is an exemplary process flow diagram for a carbon dioxide sequestration system according to certain embodiments of the disclosure.

FIG. 1 depicts a process flow diagram of a carbon dioxide removal system in accordance with one embodiment of the disclosure. A first component 10, a second component 12, and water 14 are combined to form a fresh scrubbing material 16. The fresh scrubbing material 16 may be stored in a tank prior to use in a reactor 20. The fresh scrubbing material 16 is introduced into the reactor 20 and is contacted with an effluent stream 22 containing carbon dioxide to scrub and remove the carbon dioxide. The reactor 20 comprises a mixing zone 24, where the fresh scrubbing material 16 and the effluent stream 22 are combined, preferably with turbulent flow. The scrubbing material 16 reacts with the carbon dioxide to form a product 26 collected within the reactor 20. The product 26 comprises calcium carbonate and spent scrubbing material. The product 26 exits the reactor 20 and enters a separator 28, where the calcium carbonate product 30 is separated from spent scrubbing material 32.

As discussed above, it is believed that the active compounds are reactive silicates and calcium oxide. While not limiting as to the present teachings, it is believed that the scrubbing material undergoes the following reaction mechanisms. The water and carbon dioxide form carbonate anions in a basic pH solution. The carbonate anions react with calcium ions in the presence of reactive silicates to form calcium carbonate. The spent scrubbing material 16 comprises the reactive silicates. The alkali metal ions provide desirable basicity to the solution, which promotes reaction of the carbon dioxide with the calcium oxide and silicates, and further is believed to favor formation of reactive silicate products in the spent scrubbing materials. The spent scrubbing material 32 still contains reactive silicates and desirably high alkali metal ions, which help to maintain the pH. It is believed that the carbonation reaction reduces the pH (to more neutral conditions) of the scrubbing material, thus the alkalinity of the first component is desirable.

In certain embodiments, the scrubbing system is continuous and regenerative. Thus, after the contacting in the mixing zone 24 of the reactor 20 the spent scrubbing composition 32 is separated from the product. The spent scrubbing material 32 is optionally returned to the fresh scrubbing material source 16. In this manner, the spent scrubbing material 32 can be combined with fresh scrubbing material 16 prior to subsequent contacting with the carbon-dioxide containing fluid stream. Thus, a portion of the spent scrubbing material 32 can be recycled into the fresh scrubbing material 16, desirably providing both reactive silicates and alkalinity to promote a basic pH scrubbing material slurry. The spent scrubbing material 32 can also be removed from the system for disposal 34.

In certain embodiments, the spent scrubbing material 32 and/or fresh scrubbing material 16 are monitored to determine how much recycling or alternatively, purging of the scrubbing material (via disposal) is necessary. For example, the spent scrubbing material 32 and/or the mixture of spent and fresh scrubbing material can be monitored at representative points 36 and 38 for an alkali ion content of the spent scrubbing material. If the alkali ion content is too low or too high, i.e., if the alkali metal ion content deviates from a predetermined set point, a portion of the spent scrubbing material is then removed. For example, if the concentration of alkali metal ions is too low, the desired alkalinity may be too low for recycling. Further, if the alkali metal ion content is too high, the spent scrubbing material 32 can be purged. The predetermined amount can be used in a control system and can be determined by empirical observation of the system and/or by calculations modeling the system. Likewise, the pH of the spent scrubbing material 32 and/or a mixture of the spent scrubbing material with fresh scrubbing material can be monitored at representative 36 and 38. If the pH exceeds a predetermined set point, a portion of the spent scrubbing material 32 is removed via disposal 34. The ranges of predetermined pH can be ascertained by empirical observation and/or calculation. As described previously, in certain aspects, the scrubbing material contacting the carbon dioxide has a basic pH of greater than or equal to about 7, preferably greater than or equal to about 9, and in some circumstances greater than or equal to about 11.

As described above, it is preferable that the scrubbing material 16 contacts fluid stream 22 in a turbulent mixing zone 24 of the reactor 20. In embodiments where the scrubbing material is a slurry, the high energy slurry stream contacts the gas stream and effects mass transfer. The mixing zone 24 preferably provides a high surface area to achieve sufficient mass transfer. In typical manufacturing facilities, effluent or exhaust streams from various processes have flow rates ranging from about 10,000 actual ft$^3$/min (acfm) (about 285 m$^3$/min) to about 1,000,000 acfm (about 28,000 m$^3$/min). However, as appreciated by those of skill in the art, such flow rates vary based on the capacity of the facility and the type of process, and are difficult to generalize. For example, kiln exhaust from a typical cement manufacturing facility is usually between about 100,000 acfm (2,800 m$^3$/min) to about 400,000 acfm (about 11,000 m$^3$/min) and typical boiler exhaust flow rates can range from about 100,000 (2,800 m$^3$/min) to about 600,000 acfm (17,000 m$^3$/min). Thus, in certain embodiments, the reactor 20 is capable of processing typical industrial exhaust gas flow rates.

In certain embodiments, the contacting occurs at ambient pressure conditions. In various embodiments, the contacting of the scrubbing material 16 and the effluent fluid stream 22 occurs in an environment at less than or equal to about 100° C. (212° C.) at ambient pressure, to prevent evaporation of the water in the slurry. In this regard, the effluent stream 22 may need to be cooled, for example by a heat exchanger shown as 40 in FIG. 1, prior to contacting the scrubbing material or the pressure of the system may need to be increased to prevent undesirable evaporation of the water. In some embodiments, the contacting occurs in an environment of less than or equal to about 75° C. (approximately 170° F.); optionally less than or equal to about 40° C. (approximately 100° F.). In some embodiments, the contacting of the scrubbing material with the fluid stream occurs at ambient pressure and ambient temperature conditions. Such embodiments may require cooling of the effluent stream prior to contact, as well known to those of skill in the art and discussed above. Thus, the treated effluent 44 exits the reactor 20 having a reduced amount of carbon dioxide as compared to an initial amount of carbon dioxide present in the untreated effluent stream 22. In certain aspects, the removal efficiency of the reactor 20 is greater than 20%, optionally greater than 30%. In certain aspects, the removal efficiency is optimized to be greater than 50%; optionally greater than 75%; optionally greater than 90%, and in some embodiments greater than 95%.

After the reaction of carbon dioxide in the effluent stream 22 with the scrubbing material 16, a product 26 comprising calcium carbonate and spent scrubbing material is generated. While some water may be lost during the contacting and reaction, a large portion of water will remain in the product 26. In some embodiments, this product 26 may be agitated to prevent agglomeration and/or hardening of the silicate materials. The calcium carbonate can then be processed via a separator 28 from the spent scrubbing material, for example by filtration. In certain embodiments, the calcium carbonate 30 has a beneficial reuse and can be employed as a raw material in another process such that it is recycled. In some embodiments, the water content of a separated calcium carbonate product 30 may be too high. The calcium carbonate product may be separated from the water to achieve desirable moisture content depending on the end use. For example, such separation of the calcium carbonate can be achieved by evaporation, separation, and/or by filtration (not shown in FIG. 1). Thus, suitable equipment may include heaters, centrifuges, screen filters, filter presses, rotary disk filters, vacuum filters, and the like, as are well known in the art. When the spent scrubbing material 32 is separated in the separator 28, it may be prepared for disposal 34 or may be recycled by reintroducing it to fresh scrubbing material 16. For such recycling, it may be desirable to agitate the mixture periodically during transport (non-laminar flow) and further to add water to reduce viscosity and enhance pumping (not shown in FIG. 1).

In some embodiments, the contacting of the scrubbing material occurs in a fluidized bed reactor, a slurry bed reactor, a venturi scrubber, a spray tower scrubber, a packed scrubber reactor, a continuously stirred tank reactor (CSTR), and/or any combinations thereof. In certain embodiments using a viscous scrubbing material slurry, the contacting occurs in a slurry bed reactor, a spray tower scrubber and/or a CSTR. In other embodiments, particularly where the scrubber material comprises semi-dry particles, a fluidized bed reactor or a venture scrubber can be used. The listing of the above reactors is non-limiting, as other suitable reactors well known in the art are contemplated by the present disclosure.

Fluidized bed reactors suspend solid particles on upward-blowing jets of gas during the reaction process and are well known in the art. For example, atmospheric fluidized beds use a sorbent to capture sulfur generated by fossil fuel combustion. In certain aspects, fluid should flow upward and have sufficient fluid velocity to lift the particles via friction forces. In this manner, a turbulent mixing of solids and gases is achieved. In certain aspects of the disclosure, the effluent stream may comprise sufficient water (or the water can be added prior to the reactor in the effluent stream or in the scrubbing material, if necessary) to enable reaction with a semi-dry scrubbing material in a fluidized bed reactor.

Wet scrubbing generally uses a high energy liquid stream to contact the gas stream and affect mass transfer. In continuously stirred tank reactors (CSTR) one or more fluid reagents are introduced into a tank reactor equipped with one or more impeller(s). The impeller stirs the reagents to ensure proper mixing. Effluent is continuously removed from the tank. CSTRs often contain baffles and multiple inlets and/or effluent removal points to provide homogeneity in the mixing. Further, the effluent fluid/gas can be injected into the CSTR at numerous locations within the reactor to enhance mixing and the gas/liquid/solid interfaces.

Wet scrubber reactors are often used in flue gas desulfurization processes. There are several main kinds of wet scrubbers, including a venturi scrubber, a packed tower scrubber, and a spray tower scrubber. A venturi scrubber is a converging/diverging section of duct. The converging section accelerates the fluid stream to a high velocity. When the slurry stream is injected at the throat or point of maximum velocity, the turbulence caused by the high gas velocity atomizes the liquid into small particles and/or droplets, which creates the surface area necessary for mass transfer to take place. The higher the pressure drop in the venturi, the smaller the atomized particles and the higher the surface area.

A packed scrubber reactor consists of a tower with small objects disposed therein. These objects can be in the shape of saddles, rings or specialized shapes that are designed to maximize contact area between the exhaust gas and liquid. Packed towers typically operate at much lower pressure drops than a venturi scrubber and typically provide higher pollutant removal efficiency. In certain aspects, the liquid/slurry has a low viscosity when used in such a reactor.

Most wet scrubbers are designed as a spray tower. A spray tower scrubber reactor has a relatively simple design, which consists of a tower with spray nozzles, which generate the droplets for surface contact. A spray tower is one particularly suitable reactor for using a slurry scrubber, as such towers generally avoid material plugging.

The tower is typically designed so that, at maximum load, the average superficial gas velocity will not exceed the design gas velocity. For most spray towers, the average gas velocity varies from about 8 to 13 ft/sec. (2.4 to 4 m/sec) based upon scrubber outlet conditions, however the present disclosure is not limited to any particular velocities. The effluent/flue gas enters the absorber reactor from a side fluid inlet. The design of the tower is influenced by the scrubbing material, the desired $CO_2$ removal level, a tradeoff between fan power and recirculation slurry pump power, as well as several other factors well known to those of skill in the art. Spray nozzles are conventionally used in wet scrubbers, and such nozzles assist with controlling the mixing of scrubbing material slurry with the effluent gas. The operating pressures typically vary between about 5 and 20 psi (34 and 138 kPa), although the disclosure is not limited to such exemplary pressures. Spray nozzles without internal obstructions are favored to minimize plugging by trapped debris. A large tank at the bottom of the spray tower/reaction chamber is usually referred to as a reaction tank or the recirculation tank. The volume of this tank permits several chemical and physical processes to approach completion. Gas-liquid-solid contacting in the towers permits high efficiency for pollutant removal and maximization of reagent utilization. The gas follows the reaction chamber walls to the rear end of the absorber exits at the rear of the absorber.

Figure 2:
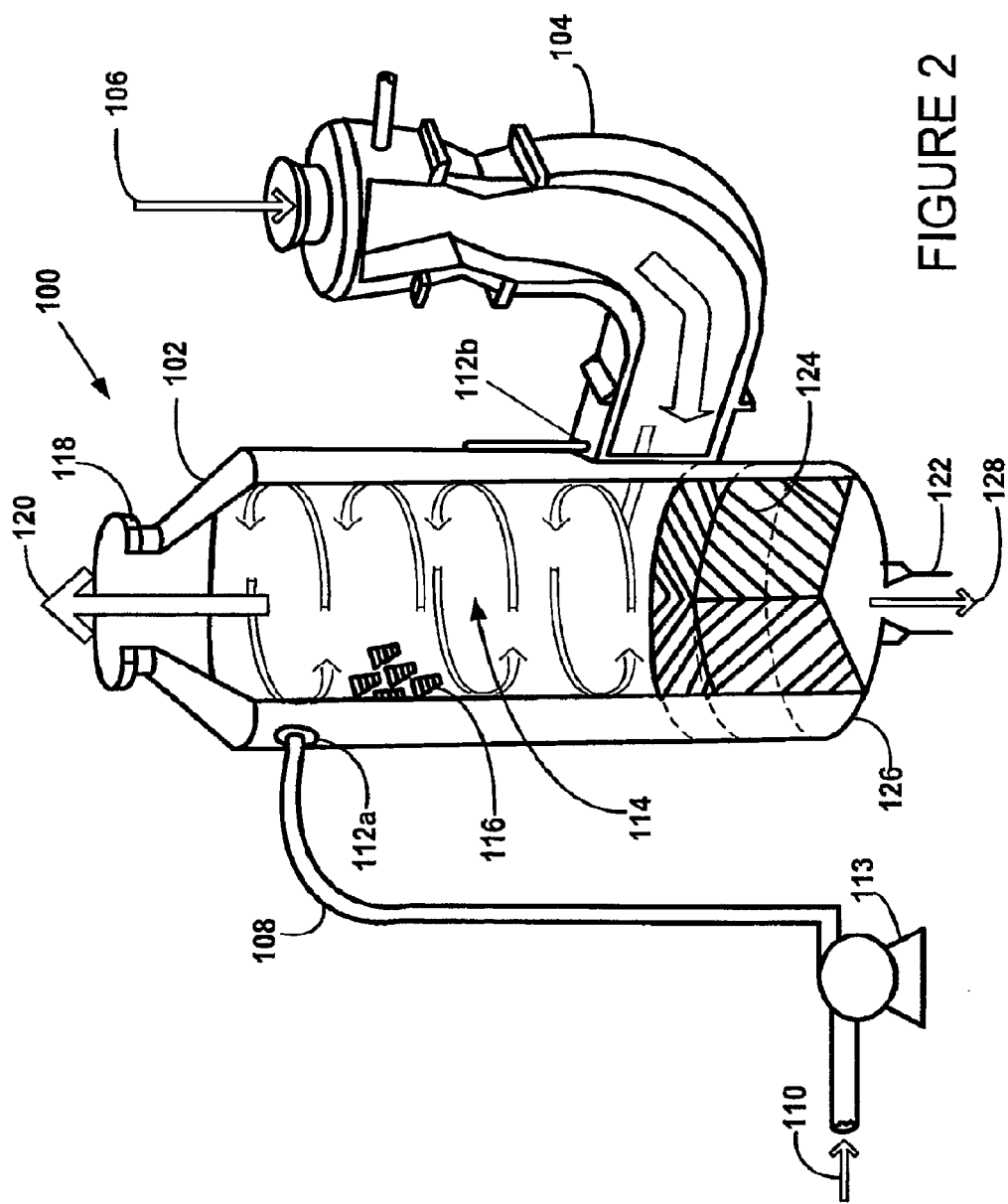
FIG. 2 is a schematic illustration of one embodiment of the present disclosure showing a carbon-dioxide emission abatement system with a scrubber tower reactor.

As shown in FIG. 2, in certain embodiments, a carbon-dioxide emission abatement system comprises a scrubber tower reactor 100 that comprises a reaction chamber 102. The reaction chamber 102 is in fluid communication with a fluid inlet/inlet passage 104, here shown as a down comer duct. The fluid inlet 104 permits ingress of an effluent fluid stream into the reaction chamber 102. The effluent fluid stream 106 preferably is generated upstream in a furnace, an incinerator, a boiler, or a kiln, and comprises carbon dioxide. A source of slurry 108 comprises a slurry 110 having a first component comprising a source of calcium oxide and a source of alkali metal ions; a second component comprising a slag having a source of reactive silicates; and water. The source of slurry 108 is in fluid communication with a slurry inlet 112a disposed in the reaction chamber 102 that feeds slurry 108 to the reaction chamber 102. It should be noted that in alternate embodiments, the slurry 110 can be introduced in the inlet passage 104 with the effluent stream 106, for example, at an alternate slurry inlet 112b. Further, in certain embodiments, the slurry 110 can be introduced at both slurry inlets 112a and 112b. The source of slurry 108 generally comprises a storage tank (not shown) and a pumping system 113.

The reaction chamber 102 also comprises a mixing zone 114 disposed in the reaction chamber 102. The mixing zone 114 is designed to turbulently mix the effluent fluid stream 106 and the slurry 110. The mixing zone 114 may further contain additional means for effecting turbulence, for example baffles or chevron plates 116 (for simplicity only shown in a small portion of the mixing zone, but which can extend throughout the mixing zone 114) for enhancing the opportunity for interface between the effluent gas 106 and the slurry 110 within the reactor 100. Further, the reaction chamber 102 is sized, or has a volume sufficient to provide a residence time, that enables treatment of the effluent stream to reduce an amount of carbon dioxide by a suitable amount, which is at least about 30% in a preferred embodiment. A residence time generally refers to $$T = \frac{\text{reactor volume}}{\text{gas flow rate}},$$

indicating a mean time that a molecule is within a reactor 100. As such, in accordance with certain aspects of the disclosure, the reactor chamber 102 is sized to have a volume that permits the effluent fluid 106 to have a sufficient residence time to react with the scrubbing material slurry 110. As appreciated by those of skill in the art, such volumes can be determined by the flow rate of effluent fluid to be treated.

The reactor system 100 further comprises a fluid outlet passage 118 in fluid communication with the reaction chamber 102 to permit egress of the treated effluent stream 120 from the reaction chamber 102. A large reservoir 124 at the bottom 126 of the reaction chamber 102 is usually referred to as a reaction tank or the recirculation tank. This reservoir 124 is sized to permit the desired carbon sequestration reactions to approach completion without allowing setting or hardening of the spent slurry/product collected there. While not shown, the reservoir 124 optionally comprises agitation equipment, such as agitation screens or pumps, for example, that furthers the objective of preventing setting of the spent scrubbing material. A slurry outlet/removal passage 122 is in fluid communication with the reactor chamber 102 for removing spent slurry and/or a calcium carbonate product 128. While not shown in FIG. 2, the spent slurry solution can be separated from calcium carbonate and then recirculated into the slurry source 108.

FIG. 3 depicts one embodiment of a carbon dioxide removal system much the same as that shown in FIG. 1, but comprising one or more air pollution control devices 50 (APCDs) that further treat the effluent stream 44 after it has exited the reactor 20. As appreciated by those of skill in the art, the effluent stream comprises one or more additional pollutants other than $CO_2$. For example, in addition to carbon dioxide, common air pollutants found in effluent streams from boilers, kilns, furnaces, and incinerators include carbon monoxide, hydrochloric acid, chlorofluorocarbons, nitrous oxides, sulfur oxides, particulate matter, volatile organic compounds, aerosol compounds, mercury, lead, ammonia, ozone, and mixtures and equivalents thereof. Thus, in some embodiments, the reactor 20 may serve to incidentally remove a portion of these other pollutants, however, it is contemplated that additional APCDs 50 may be required to reduce the one or more additional pollutants to acceptable concentrations. Typical exemplary APCDs 50 include electrostatic precipitators, baghouse filters, cyclones, activated carbon scrubbers, flue gas desulfurization scrubbers, thermal oxidizers, pressure swing adsorbers, selective catalytic reactors, selective non-catalytic reactors, and the like.

In certain embodiments, such as those shown in FIG. 4, the carbon dioxide removal system further comprises one or more air pollution control devices 60 (APCDs) to pre-treat the effluent stream 22 prior to entering the reactor 20. Thus, any additional pollutants can be removed that may cause adverse or undesirable reactions with the scrubbing material or corrosion or damage to the equipment hardware.

In certain aspects, the present disclosure provides a method of reducing carbon dioxide emissions from a cement manufacturing facility. The method comprises reacting cement manufacturing raw materials (containing sources of calcium, silicon, aluminum, and iron) in a kiln to produce clinker and an effluent stream comprising carbon dioxide. At least a portion of the effluent stream is contacted with a scrubbing material such as those described in previous embodiments above. A product is generated that comprises calcium carbonate and a spent scrubbing composition. Any of the processes of the embodiments described above may be useful for the present embodiments. For example, prior to the contacting the effluent with scrubbing material, the effluent stream can be processed in one or more air pollution control devices (APCDs) to remove one or more air pollutants. Limestone or calcium carbonate is a primary raw material in the manufacture of both lime and cement. In certain embodiments, the product comprising calcium carbonate is beneficially re-used as a raw material to produce clinker and/or lime. Thus, in cement manufacturing, the generated calcium carbonate is subsequently combined with the raw materials to produce the clinker.

The spent scrubbing material can be recycled, as described previously above. In some embodiments, the methods further comprise generating cement kiln dust (CKD) during the reaction of the raw materials. The scrubbing material can comprise at least a portion of the generated cement kiln dust (CKD). The CKD can be collected via a particulate matter APCD (e.g., baghouse or ESP) and then introduced into the scrubbing material. However, it is also contemplated that in certain embodiments, the effluent stream contacts the scrubbing material before entering a particulate matter control device, thus the CKD particles are entrained in the effluent stream and can supplement the scrubbing material as a source of calcium ions and alkali metal ions. As described above, in certain preferred aspects, the first component comprises cement kiln dust (CKD) and the second component comprises stainless steel slag.

Some manufactured cement is designated as low alkali and as such, the raw materials for making the cement likewise must have relatively low alkali content. If the alkali metal ions partition into the calcium carbonate product, it may be necessary to reduce the concentration of alkali ions in the calcium carbonate product to promote partitioning to the spent scrubbing product. In this manner, the spent scrubbing material and/or calcium carbonate product can be monitored for alkali ion content to prevent unwanted alkali build-up in the kiln or clinker product.

In other embodiments of the disclosure, a method for reducing carbon dioxide emissions from a cement and/or lime manufacturing facility is provided. The scrubbing material is contacted with at least a portion of an effluent stream comprising carbon dioxide. The effluent stream is generated in a kiln. The scrubbing material comprises a first component, a second component distinct from the first component, and water, as in any of the embodiments previously described. The method further comprises generating a product comprising calcium carbonate and a spent scrubbing material. The calcium carbonate product is then re-used as a raw material in the kiln. In some embodiments, the reacting of the raw materials further comprises generating cement kiln dust (CKD) or lime kiln dust (LKD) and the scrubbing material comprises at least a portion of the generated cement kiln dust (CKD) or lime kiln dust (LKD).

The present disclosure further provides embodiments to reduce carbon dioxide emissions from an iron and/or steel manufacturing facility. The method comprises contacting a scrubbing material with at least a portion of an effluent stream comprising carbon dioxide that is generated in a furnace of an iron and/or steel manufacturing process. The furnace can be any of those described above in the context of the slag sources, such as a blast furnace (iron ore processing), an open hearth furnace (steel processing), a basic oxygen process furnace (steel processing), or an electric arc furnace (steel processing). The scrubbing material comprises a first component, a second component distinct from the first component, and water, as where described above. A product comprising calcium carbonate is generated that is capable of reuse as a raw material in an industrial process. In certain embodiments, the second component comprises a slag generated in the iron and/or steel manufacturing process. Further the calcium carbonate product can be recycled and used as a flux material in the iron and/or steel manufacturing process. In other embodiments, the calcium carbonate can be used as a raw material in any industry that employs calcium carbonate as a raw material, such as in cement and lime manufacturing.

In yet other embodiments, methods of reducing carbon dioxide emissions from a hydrocarbon combustion source, such as a power plant boiler or an incinerator, are provided. A hydrocarbon combustion source comprises all stationary point sources that combust hydrocarbons that form carbon dioxide, including those facilities that burn fossil-fuels (e.g., coal, methane), synthetic fuels (e.g., petroleum coke, syngas, ethanol), or any other variety of hydrocarbons. The process comprises contacting a scrubbing material with at least a portion of an effluent stream comprising carbon dioxide that is generated by combustion of a fossil-fuel. The scrubbing material is any of those described above. A product comprising calcium carbonate that is capable of reuse as a raw material in an industrial process is thus generated.

In various embodiments, the present disclosure provides methods of recycling industrial byproducts which would otherwise be stockpiled, land-filled, or discarded. For example, in certain embodiments, a method of recycling industrial byproducts is provided. A carbon dioxide scrubbing material is formed by admixing a first manufactured component with a second manufactured component. The first component comprises a source of calcium oxide and a source of alkali metal ions. The second component comprises a slag having one or more reactive silicate compounds. An effluent stream generated in an industrial process comprising carbon dioxide is then contacted with the scrubbing material. A product comprising calcium carbonate is generated that is capable of beneficial reuse such as in an industrial process. In some embodiments, after the contacting and after the generating, the scrubbing material is spent and at least a portion of the spent scrubbing material is admixed with the fresh first manufactured component and the fresh second manufactured component.

In this manner, the methods and scrubbing materials of the disclosure further sustainable development initiatives, which include balancing the need for current growth and development against the need to protect the natural and manmade environment for future generations. Further, the methods and systems of the disclosure provide reduced carbon dioxide emissions for various stationary point sources, which in addition to reducing greenhouse gas emissions, provides the ability for such point sources to comply with various regulations, to receive an economic and commercial benefit through carbon dioxide emission credit trading programs, and to reduce potential corrosion and inefficiencies attendant with the presence of carbon dioxide in effluent streams.

What is claimed is:

1. A method of removing carbon dioxide from an effluent stream comprising carbon dioxide, the method comprising:
reducing an amount of carbon dioxide in the effluent stream by contacting the effluent stream with a scrubbing material comprising (i) a first component comprising a source of calcium oxide and a source of alkali metal ions and (ii) a second component comprising a slag having one or more reactive silicate compounds, wherein the first component is distinct from the second component, and the contacting occurs in the presence of water, wherein the alkali metal ions of the first component contribute to increasing a pH of the scrubbing material to about 9 or higher to increase the rate of reaction of the carbon dioxide with the scrubbing material.

2. The method according to claim 1, wherein after the contacting, the amount of carbon dioxide is less than or equal to about 50% of an initial amount of carbon dioxide prior to the contacting.

3. The method according to claim 1, wherein the effluent stream further comprises one or more additional air pollutants selected from the group consisting of: carbon monoxide, chlorofluorocarbons, hydrochloric acid, nitrous oxides, sulfur oxides, particulate matter, volatile organic compounds, aerosol compounds, mercury, lead, ammonia, and ozone, wherein the contacting with the scrubbing material also reduces an amount of at least one of the one or more additional air pollutants in the effluent stream.

4. The method according to claim 3, wherein the one or more additional air pollutants are selected from the group consisting of: carbon monoxide, hydrochloric acid, nitrous oxides, sulfur oxides, particulate matter, volatile organic compounds, aerosol compounds, mercury, lead, ammonia, and ozone.

5. The method according to claim 1, wherein the first component comprises a material selected from the group consisting of: cement kiln dust, lime kiln dust, sugar beet lime, clinker dust, slaked lime, quick lime, and combinations thereof, and the second component comprises a material selected from the group consisting of blast furnace slag, steel slag, and combinations thereof, and a ratio of the first component to the second component in the scrubbing material is about 10:1 to about 1:10.

6. The method according to claim 1, wherein the first component comprises cement kiln dust (CKD) and the second component comprises a stainless steel slag.

7. The method according to claim 1, wherein the scrubbing material further comprises water, wherein the scrubbing material comprises about 15% by weight to about 50% by weight of the first component, about 15% by weight to about 50% by weight of the second component, and about 15% by weight to about 50% by weight by weight water.

8. The method according to claim 1, wherein the first component comprises one or more active ingredients selected from the group consisting of: $CaO$, $Na_2O$, and $K_2O$, and the second component comprises one or more active ingredients selected from the group consisting of: $CaSiO_3$ and $CaO$.

9. The method according to claim 1, wherein the effluent stream is generated by one or more of: boilers, furnaces, incinerators, cement kilns, or lime kilns.

10. The method according to claim 1, wherein the contacting is a continuous process and the effluent stream has a flow rate of greater than or equal to about 10,000 actual $ft^3$/min (acfm) to less than or equal to about 1,000,000 $ft^3$/min (acfm) and the contacting occurs in a reactor selected from the group consisting of: a fluidized bed reactor, a bed reactor, a venturi scrubber, a spray tower scrubber, a packed scrubber reactor, a continuously stirred tank reactor, and combinations thereof.

11. The method according to claim 1, wherein the first component comprises:
calcium oxide (CaO) at about 30 to about 45% by weight;
silica ($SiO_2$) at about 10 to about 20% by weight;
alumina ($Al_2O_3$) at about 2 to about 7% by weight;
iron oxide ($Fe_2O_3$) at about 1 to about 3% by weight;
magnesium oxide (MgO) at about 0.5 to about 3% by weight;
sulfate ($SO_3$) at about 1 to about 15% by weight;
sodium oxide ($Na_2O$) at about 0.1 to about 1% by weight; and
potassium oxide ($K_2O$) at about 0.1 to about 15% by weight, and the second component comprises:
silica ($SiO_2$) at about 10 to about 35% by weight;
calcium oxide (CaO) at about 35 to about 55% by weight;
magnesium oxide (MgO) at about 3 to about 10% by weight;
iron oxide (FeO) at about 0.1 to about 40% by weight; and
alumina ($Al_2O_3$) at about 0.1 to about 10% by weight.

12. The method according to claim 1, wherein the contacting further comprises generating a spent scrubbing material and the method further comprises monitoring an alkali ion content of the spent scrubbing material, wherein a portion of the spent scrubbing material is removed when the alkali ion content deviates from a predetermined set point.

13. The method according to claim 1, wherein the contacting further comprises generating a spent scrubbing material and the method further comprises monitoring a pH of the spent scrubbing material, wherein a portion of the scrubbing material is removed when the pH deviates from a predetermined set point.

14. A method of reducing emissions from a cement manufacturing process or a lime manufacturing process, the method comprising:
contacting at least a portion of an effluent stream generated in a cement kiln or a lime kiln with a scrubbing material comprising (i) a first component comprising a source of calcium oxide and a source of alkali metal ions and (ii) a second component comprising a slag having one or more reactive silicate compounds, wherein the first component is distinct from the second component and the contacting occurs in the presence of water, wherein the effluent stream comprises carbon dioxide and at least one additional pollutant selected from the group consisting of nitrous oxides, sulfur oxides, hydrochloric acid, particulate matter, volatile organic compounds, mercury and combinations thereof, wherein the contacting reduces a total amount of the carbon dioxide to less than or equal to about 50% of an initial amount of the carbon dioxide prior to the contacting.

15. The method according to claim 14, wherein the contacting with the scrubbing material also reduces an amount of the at least one additional air pollutant in the effluent stream.

16. The method according to claim 15, wherein the at least one additional pollutant comprises mercury.

17. The method according to claim 14, wherein the alkali metal ions of the first component contribute to increasing a pH of the scrubbing material to about 9 or higher to increase the rate of reaction of the carbon dioxide with the scrubbing material.

18. The method according to claim 14, wherein the contacting is a continuous process and the effluent stream has a flow rate of greater than or equal to about 10,000 actual $ft^3$/min (acfm) to less than or equal to about 1,000,000 $ft^3$/min (acfm) and the contacting occurs in a reactor selected from the group consisting of: a fluidized bed reactor, a bed reactor, a venturi scrubber, a spray tower scrubber, a packed scrubber reactor, a continuously stirred tank reactor, and combinations thereof.

19. The method according to claim 14, further comprising generating a product comprising calcium carbonate and a spent scrubbing material after the contacting and re-using the calcium carbonate in the cement manufacturing process or the lime manufacturing process.

20. The method according to claim 14, wherein the first component comprises a material selected from the group consisting of: cement kiln dust, lime kiln dust, sugar beet lime, clinker dust, slaked lime, quick lime, and combinations thereof, and the second component comprises a blast furnace slag, steel slag, and combinations thereof.

21. The method according to claim 14, wherein the cement kiln further generates a cement kiln dust (CKD) or the lime kiln further generates a lime kiln dust (LKD), and the method further comprises introducing at least a portion of the generated cement kiln dust (CKD) or lime kiln dust (LKD) into the scrubbing material.

22. A method of reducing emissions from a hydrocarbon fuel combustion source, the method comprising:
contacting a scrubbing material with at least a portion of an effluent stream that is generated by a combustion source in a reactor so as to remove carbon dioxide, wherein the scrubbing material comprises (i) a first component comprising a source of calcium oxide and a source of alkali metal ions and (ii) a second component comprising a slag having one or more reactive silicate compounds, wherein the first component is distinct from the second component and the alkali metal ions of the first component contribute to increasing a pH of the scrubbing material to about 9 or higher to increase the rate of reaction of the scrubbing material with the carbon dioxide, wherein the contacting occurs in the presence of water and the reactor has a removal efficiency for a total amount of carbon dioxide of greater than 50%.

23. The method according to claim 22, wherein the first component comprises a material selected from the group consisting of: cement kiln dust, lime kiln dust, sugar beet lime, clinker dust, slaked lime, quick lime, and combinations thereof, and the second component comprises a material selected from the group consisting of a blast furnace slag, a steel slag, and combinations thereof.

24. The method according to claim 22, wherein the combustion source is selected from the group consisting of a boiler, a furnace, an incinerator, a cement kiln, a lime kiln, and combinations thereof.

25. The method according to claim 22, wherein the contacting is a continuous process and the effluent stream has a flow rate of greater than or equal to about 10,000 actual $ft^3$/min (acfm) to less than or equal to about 1,000,000 $ft^3$/min (acfm) and the contacting occurs in a reactor selected from the group consisting of: a fluidized bed reactor, a bed reactor, a venturi scrubber, a spray tower scrubber, a packed scrubber reactor, a continuously stirred tank reactor, and combinations thereof.

26. The method according to claim 22, wherein the effluent stream further comprises one or more air pollutants selected from the group consisting of: carbon monoxide, chlorofluorocarbons, hydrochloric acid, nitrous oxides, sulfur oxides, particulate matter, volatile organic compounds, aerosol compounds, mercury, lead, ammonia, and ozone, wherein the contacting with the scrubbing material also reduces an amount of at least one of the one or more air pollutants in the effluent stream.

* * * * *

UNITED STATES PATENT AND TRADEMARK OFFICE
CERTIFICATE OF CORRECTION

| | | |
|---|---|---|
| PATENT NO. | : 8,105,558 B2 | Page 1 of 1 |
| APPLICATION NO. | : 13/025905 | |
| DATED | : January 31, 2012 | |
| INVENTOR(S) | : Douglas C. Comrie | |

It is certified that error appears in the above-identified patent and that said Letters Patent is hereby corrected as shown below:

Col. 8, line 26, "$CaCO_3.MgCO_3$" should be -- $CaCO_3 \cdot MgCO_3$ --

Col. 9, line 62, "$2\ CaO.SiO_2$" should be -- $2\ CaO \cdot SiCO_2$ --

Col. 9, line 64, "$3\ CaO.SiO_2$" should be -- $3\ CaO \cdot SiO_2$ --

Col. 10, line 39, "$CaCO_3.MgCO_3$" should be -- $CaCO_3 \cdot MgCO_3$ --

Col. 12, line 45, "20-30 $Fe_2O_3$" should be -- 20-30% $Fe_2O_3$ --

Col. 12, line 60, after "they" insert -- are --

Col. 17, line 22, "212°C" should be -- 212°F --

Col. 22, line 41, after "further" insert -- provide --

Signed and Sealed this
Nineteenth Day of June, 2012

David J. Kappos
*Director of the United States Patent and Trademark Office*

UNITED STATES PATENT AND TRADEMARK OFFICE
CERTIFICATE OF CORRECTION

PATENT NO. : 8,105,558 B2
APPLICATION NO. : 13/025905
DATED : January 31, 2012
INVENTOR(S) : Douglas C. Comrie It is certified that error appears in the above-identified patent and that said Letters Patent is hereby corrected as shown below:

Col. 8, line 26, "$CaCO_3.MgCO_3$" should be -- $CaCO_3 \cdot MgCO_3$ --

Col. 9, line 62, "$2\ CaO.SiO_2$" should be -- $2\ CaO \cdot SiO_2$ --

Col. 9, line 64, "$3\ CaO.SiO_2$" should be -- $3\ CaO \cdot SiO_2$ --

Col. 10, line 39, "$CaCO_3.MgCO_3$" should be -- $CaCO_3 \cdot MgCO_3$ --

Col. 12, line 45, "20-30 $Fe_2O_3$" should be -- 20-30% $Fe_2O_3$ --

Col. 12, line 60, after "they" insert -- are --

Col. 17, line 22, "212°C" should be -- 212°F --

Col. 22, line 41, after "further" insert -- provide --

This certificate supersedes the Certificate of Correction issued June 19, 2012.

Signed and Sealed this
Second Day of October, 2012

David J. Kappos
*Director of the United States Patent and Trademark Office*